(12) United States Patent
Hibi et al.

(10) Patent No.: US 6,591,414 B2
(45) Date of Patent: *Jul. 8, 2003

(54) BINARY PROGRAM CONVERSION APPARATUS, BINARY PROGRAM CONVERSION METHOD AND PROGRAM RECORDING MEDIUM

(75) Inventors: Yoshinobu Hibi, Kawasaki (JP);
Hidefumi Nishi, Kawasaki (JP);
Toshiki Izuchi, Kawasaki (JP);
Masaharu Kitaoka, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,207

(22) Filed: Oct. 3, 1997

(65) Prior Publication Data

US 2001/0003822 A1 Jun. 14, 2001

(30) Foreign Application Priority Data

Oct. 28, 1996 (JP) .............................................. 8-285670

(51) Int. Cl.[7] ................................................. G06F 9/45
(52) U.S. Cl. ....................................................... 717/151
(58) Field of Search ................................. 395/704, 706, 395/707; 717/136, 138, 139, 140, 151–158

(56) References Cited

U.S. PATENT DOCUMENTS

| 5,212,794 | A | * | 5/1993 | Pettis et al. ................. 395/709 |
| 5,317,738 | A | * | 5/1994 | Cochcroft et al. |
| 5,664,191 | A | * | 9/1997 | Davidson et al. ........... 709/100 |
| 5,752,038 | A | * | 5/1998 | Blake et al. ................. 717/158 |
| 5,765,204 | A | * | 6/1998 | Bakke et al. |
| 5,768,593 | A | * | 6/1998 | Walters |
| 5,815,720 | A | * | 9/1998 | Buzbec |
| 5,842,017 | A | * | 11/1998 | Hodkway |
| 6,129,458 | A | * | 10/2000 | Waters et al. ............... 711/133 |

FOREIGN PATENT DOCUMENTS

JP 5-322481 12/1993

OTHER PUBLICATIONS

S. McFarling; *Program Optimization for Instruction Caches*; Computer Architecture News; 1989; vol. 17; No. 2; pp. 183–191.

Karl Pettis et al.; *Porfile Guided Code Positioning*; ACM Sigplan '90 Conference; 1990; pp. 16–27.

(List continued on next page.)

*Primary Examiner*—Zarni Maung
*Assistant Examiner*—George L. Opie

(57) ABSTRACT

A binary program conversion apparatus capable of converting an original binary program into a new binary program which runs at higher speed in a target computer having a cache memory. The binary program conversion apparatus comprises an executing part, a generating part and a producing part. The executing part executes the original binary program. The generating part generates executed blocks information indicating first instruction blocks which are executed by the executing part. The producing part produces, based on the executed blocks information generated by the generating part, the new binary program which contains second instruction blocks corresponding to the plural of the first instruction blocks and which causes, when being executed in the computer, the computer to store second instruction blocks corresponding to the first instruction blocks executed by the executing part at different locations of the cache memory.

23 Claims, 27 Drawing Sheets

OTHER PUBLICATIONS

Steven E. Speer, et al.; *Improving UNIX Kernel Performance Using Profile Based Optimization*; Winter Usenix; 1994; pp. 181–188.

B. Moolenarr; *VIM Reference Manual– Part 3*; 1996; pp. 1–72.

A. Loevenbruck; *Modification of Programs in Disk Core Image Format*; IBM Technical Disclosure Bulletin; 1972; vol. 15, No. 3; pp. 1.

Tomiyama, Hiroyuki, et al., "A Code Placement Technique to Maximize Hit Ratios of Instruction Caches", Information Processing Association Research Report, 95–ARC–115, Japan, The Meeting of Information Processing Association of Dec. 15, 1995, vol. 95, No. 119, pp. 133–138 (English Abstract only).

* cited by examiner

FIG. 2

ID     : Identifier consisting of a symbol for entry (S:instruction block, C:CTI) and block number
MADDR  : Starting address of block/address of CTI
OFF    : Offset from origin of function
SZ     : Size of block
BT     : Number of times branch is taken
RUN    : Number of times instruction block is executed
D      : Data indicating whether delay instruction of not-annulled CTI is nop or not (1; nop, 0; not nop)
TADDR  : Target address of branch/call instruction
ICODE  : Instruction code of CTI
FUNC   : Function name

| ID  | MADDR | OFF | SZ | BT | RUN | D | TADDR | ICODE | FUNC |
|-----|-------|-----|----|----|----|---|-------|-------|------|
| S1  | 40728 | 0   | 16 |    | 20 |   |       |       | foo  |
| C1  | 40730 | 8   |    | 18 | 20 | 0 | 407a8 | bne,a | foo  |
| S2  | 40738 | 16  | 24 |    | 2  |   |       |       | foo  |
| C2  | 40748 | 32  |    | 2  | 2  | 0 | 40790 | be,a  | foo  |
| S3  | 40750 | 40  | 20 |    | 0  |   |       |       | foo  |
| C3  | 4075c | 52  |    |    | 0  | 0 | 40790 | bg,a  | foo  |
| S4  | 40764 | 60  | 20 |    | 0  |   |       |       | foo  |
| C4  | 40770 | 72  |    |    | 0  | 0 | 40804 | bne,a | foo  |
| S5  | 40778 | 80  | 20 |    | 0  |   |       |       | foo  |
| C5  | 40784 | 92  |    |    | 0  | 0 | 40804 | bleu,a| foo  |
| S6  | 4078c | 100 | 4  |    | 0  |   |       |       | foo  |
| S7  | 40790 | 104 | 24 |    | 2  |   |       |       | foo  |
| C7  | 40798 | 112 |    |    | 2  | 1 | 1683fc| call  | foo  |
| C7  | 407a0 | 120 |    | 2  | 2  | 1 | 40800 | ba    | foo  |
| S8  | 407a8 | 128 | 88 |    | 18 |   |       |       | foo  |
| S9  | 40800 | 216 | 4  |    | 20 |   |       |       | foo  |
| S10 | 40804 | 220 | 60 |    | 20 |   |       |       | foo  |
| C10 | 40838 | 272 |    | 0  | 20 | 0 | 4088c | bg,a  | foo  |
| S11 | 40840 | 280 | 40 |    | 20 |   |       |       | foo  |
| C11 | 40860 | 312 |    | 0  | 20 | 0 | 408bc | bne   | foo  |
| S12 | 40868 | 320 | 32 |    | 20 |   |       |       | foo  |
| C12 | 40880 | 344 |    | 20 | 20 | 1 | 408bc | bleu  | foo  |
| S13 | 40888 | 352 | 4  |    | 0  |   |       |       | foo  |
| S14 | 4088c | 356 | 48 |    | 0  |   |       |       | foo  |
| S15 | 408bc | 404 | 8  |    | 20 |   |       |       | foo  |
| C15 | 408bc | 404 |    | 20 | 20 | 0 |       | jmpl  | foo  |

FIG. 3

| LINE | USE | LINE | USE | LINE | USE | LINE | USE |
|---|---|---|---|---|---|---|---|
| 0 | 104 | 55 | 0 | 110 | 0 | 165 | 1564 |
| 1 | 64 | 56 | 0 | 111 | 0 | 166 | 642 |
| 2 | 137 | 57 | 0 | 112 | 0 | 167 | 0 |
| 3 | 121 | 58 | 0 | 113 | 0 | 168 | 15408 |
| 4 | 10 | 59 | 10 | 114 | 0 | 169 | 22044 |
| 5 | 0 | 60 | 16 | 115 | 0 | 170 | 32 |
| 6 | 0 | 61 | 16 | 116 | 0 | 171 | 30 |
| 7 | 0 | 62 | 32 | 117 | 0 | 172 | 115 |
| 8 | 34 | 63 | 58 | 118 | 0 | 173 | 0 |
| 9 | 0 | 64 | 64 | 119 | 0 | 174 | 265 |
| 10 | 0 | 65 | 64 | 120 | 0 | 175 | 155 |
| 11 | 0 | 66 | 67 | 121 | 0 | 176 | 68 |
| 12 | 59 | 67 | 22 | 122 | 0 | 177 | 59 |
| 13 | 0 | 68 | 0 | 123 | 0 | 178 | 423 |
| 14 | 0 | 69 | 10 | 124 | 0 | 179 | 0 |
| 15 | 0 | 70 | 18 | 125 | 0 | 180 | 0 |
| 16 | 61 | 71 | 11 | 126 | 0 | 181 | 103 |
| 17 | 187 | 72 | 3 | 127 | 0 | 182 | 63 |
| 18 | 0 | 73 | 0 | 128 | 0 | 183 | 165 |
| 19 | 0 | 74 | 110 | 129 | 0 | 184 | 0 |
| 20 | 55 | 75 | 30 | 130 | 0 | 185 | 11 |
| 21 | 0 | 76 | 179 | 131 | 0 | 186 | 98 |
| 22 | 298 | 77 | 0 | 132 | 0 | 187 | 178 |
| 23 | 110 | 78 | 1 | 133 | 0 | 188 | 107 |
| 24 | 0 | 79 | 12 | 134 | 0 | 189 | 283 |
| 25 | 0 | 80 | 2 | 135 | 0 | 190 | 0 |
| 26 | 9 | 81 | 282 | 136 | 0 | 191 | 32 |
| 27 | 2 | 82 | 0 | 137 | 0 | 192 | 2 |
| 28 | 23 | 83 | 0 | 138 | 0 | 193 | 0 |
| 29 | 1 | 84 | 0 | 139 | 0 | 194 | 0 |
| 30 | 5 | 85 | 0 | 140 | 0 | 195 | 0 |
| 31 | 0 | 86 | 2 | 141 | 0 | 196 | 0 |
| 32 | 0 | 87 | 0 | 142 | 138 | 197 | 0 |
| 33 | 9 | 88 | 0 | 143 | 26 | 198 | 0 |
| 34 | 3 | 89 | 0 | 144 | 27 | 199 | 0 |
| 35 | 329 | 90 | 0 | 145 | 27 | 200 | 0 |
| 36 | 0 | 91 | 0 | 146 | 44 | 201 | 0 |
| 37 | 0 | 92 | 0 | 147 | 10 | 202 | 354 |
| 38 | 0 | 93 | 42 | 148 | 0 | 203 | 235 |
| 39 | 43 | 94 | 0 | 149 | 0 | 204 | 355 |
| 40 | 414 | 95 | 5 | 150 | 0 | 205 | 102 |
| 41 | 0 | 96 | 35 | 151 | 0 | 206 | 68 |
| 42 | 0 | 97 | 19 | 152 | 0 | 207 | 0 |
| 43 | 2 | 98 | 3 | 153 | 0 | 208 | 320 |
| 44 | 4 | 99 | 35 | 154 | 0 | 209 | 813 |
| 45 | 12 | 100 | 0 | 155 | 0 | 210 | 488 |
| 46 | 4 | 101 | 153 | 156 | 0 | 211 | 0 |
| 47 | 0 | 102 | 126 | 157 | 0 | 212 | 394 |
| 48 | 0 | 103 | 46 | 158 | 0 | 213 | 1643 |
| 49 | 58 | 104 | 27 | 159 | 0 | 214 | 10672 |
| 50 | 0 | 105 | 0 | 160 | 0 | 215 | 456 |
| 51 | 1118 | 106 | 0 | 161 | 3406 | 216 | 26377 |
| 52 | 0 | 107 | 0 | 162 | 1588 | 217 | 18 |
| 53 | 0 | 108 | 3 | 163 | 1104 | 218 | 0 |
| 54 | 0 | 109 | 0 | 164 | 54 | 219 | 0 |

FIG. 4

FROM : Starting line number
TO : Ending line number
NUM : Number of lines

| FROM | TO | NUM |
|---:|---:|---:|
| 843 | 975 | 133 |
| 3281 | 3399 | 119 |
| 1658 | 1771 | 114 |
| 3476 | 3582 | 107 |
| 8365 | 8468 | 104 |
| 10994 | 11096 | 103 |
| 13210 | 13312 | 103 |
| 3841 | 3939 | 99 |
| 4435 | 4533 | 99 |
| 1570 | 1655 | 86 |
| 3092 | 3175 | 84 |
| 1121 | 1201 | 81 |
| 13321 | 13401 | 81 |
| 1250 | 1321 | 72 |
| 13083 | 13144 | 62 |
| 4677 | 4737 | 61 |
| 4301 | 4359 | 59 |
| 6716 | 6774 | 59 |
| 16257 | 16314 | 58 |
| 10529 | 10581 | 53 |
| 3401 | 3451 | 51 |
| 12315 | 12365 | 51 |
| 8264 | 8313 | 50 |
| 13429 | 13478 | 50 |
| 4862 | 4909 | 48 |
| 11769 | 11816 | 48 |
| 2434 | 2460 | 27 |
| 4004 | 4030 | 27 |
| 6372 | 6398 | 27 |
| 6583 | 6609 | 27 |
| 7847 | 7873 | 27 |
| 7991 | 8017 | 27 |
| 105 | 130 | 26 |
| 998 | 1023 | 26 |
| 7147 | 7172 | 26 |
| 7749 | 7774 | 26 |
| 13054 | 13079 | 26 |
| 1889 | 1913 | 25 |
| 7382 | 7406 | 25 |
| 14875 | 14899 | 25 |
| 1075 | 1098 | 24 |
| 5622 | 5645 | 24 |
| 6180 | 6203 | 24 |
| 1525 | 1547 | 23 |
| 2410 | 2432 | 23 |
| 3177 | 3199 | 23 |
| 4032 | 4054 | 23 |
| 4145 | 4167 | 23 |
| 5718 | 5740 | 23 |
| 6618 | 6640 | 23 |
| 7041 | 7063 | 23 |
| 7066 | 7088 | 23 |
| 7683 | 7705 | 23 |
| 13160 | 13182 | 23 |
| 2334 | 2355 | 22 |

FIG. 17
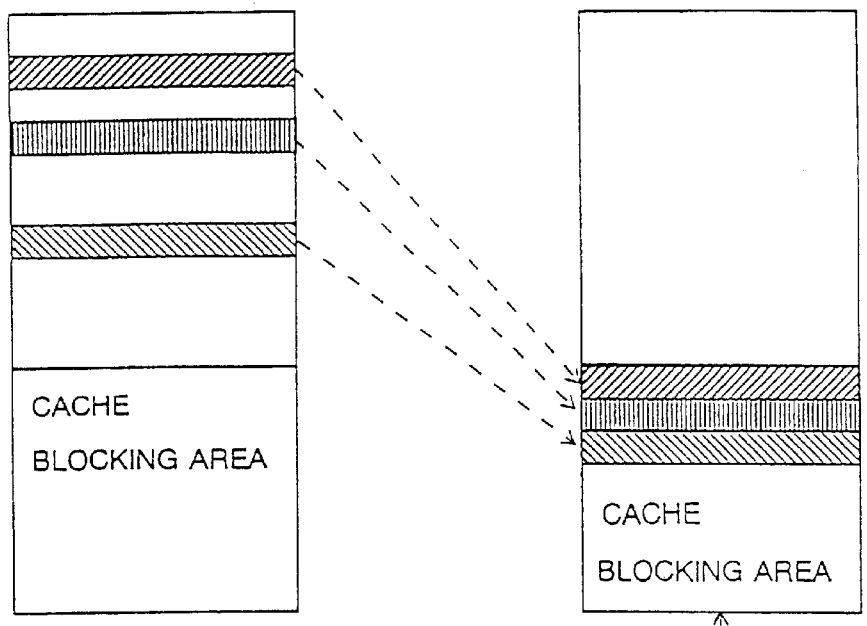
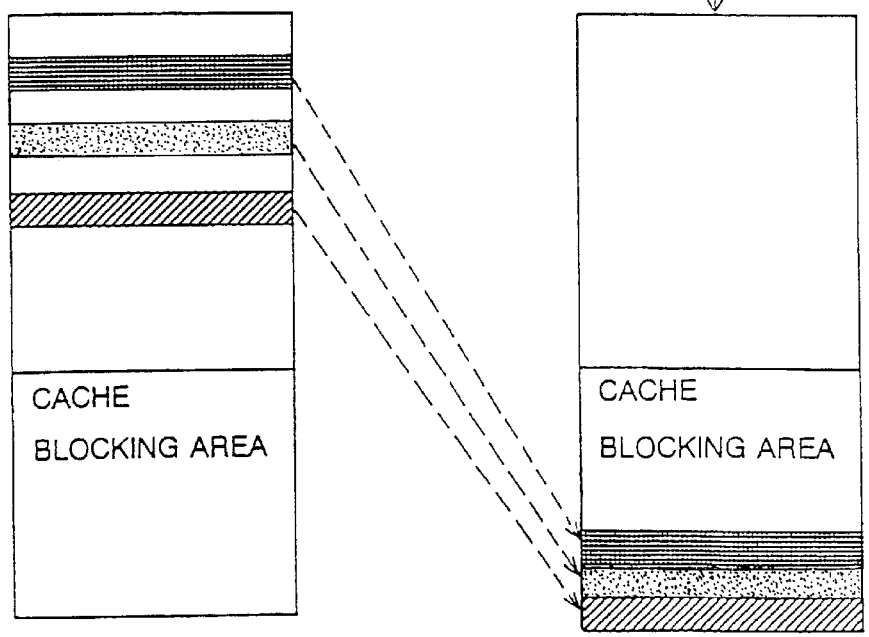

FIG. 19

```
========================
   block a:   ...
              ...
              seticc
              be c-.
              delay
------------------------
   block b:   ...
              ...
              ...
------------------------
   block c:   ...
              ...
              ...
========================
```

FIG. 21

```
==============================
   block a:   ba, a a'-.  <CaB> *1
              ...
              seticc
              be c-.
              delay
   ------------------------------
   block b:   ba, a b'-.  <CaB> *2
              ...
              ...
   ------------------------------
   block c:   ...
              ...
              ...
==============================
   block a':  ...
              ...
              seticc
              be c-.    <MTXT> *3
              delay
   ------------------------------
   block b':  ...
              ...
              ...
              ba, a c-.  <MTXT> *4
==============================
```

FIG. 22

```
===============================
   block a:   ba, a a'-.    <CaB>  *5
              ...
              seticc
              be c'-.       <CaB>  *6
              delay
   ----------------------------
   block b:   ...
              ...
              ...
   ----------------------------
   block c:   ba, a c'-.    <CaB>  *7
              ...
              ...
===============================
   block a':  ...
              ...
              seticc
              bne b-.       <MTXT>  *8
              delay
   ----------------------------
   block c':  ...
              ...
              ...
===============================
```

FIG. 23

```
==============================
   block a:   ...
              ...
              seticc
              be, a c-.   (ANNULLED BRANCH INSTRUCTION)
              delay
------------------------------
   block b:   ...
              ...
              ...
------------------------------
   block c:   ...
              ...
              ...
==============================
```

FIG. 24

```
===========================
    block a:   ba, a a'-.    <CaB>
              ...
              seticc
              be, a c'-.     <CaB>
              delay
    ---------------------------
    block b:   ...
              ...
              ...
    ---------------------------
    block c:   ba, a c'-.    <CaB>
              ...
              ...
===========================
    block a':  ...
              ...
              seticc
              bne b-.        <MTXT>   *9
              nop                    *10
              delay
    ---------------------------
    block c':  ...
              ...
              ...
===========================
```

FIG. 25

```
===============================
   block a:    ...
                ...
                seticc
                be c-.    (BT/RUN>0.5)  *11
                delay
   ----------------------------
   block b:    ...
                ...
                ...
   ----------------------------
   block c:    ...
                seticc
                bg a-.    (BT/RUN>0.5)  *12
                delay
===============================
```

FIG. 26

```
===========================
   block a:   ba, a a'-.     <CaB>
              ...
              seticc
              be, pt c'-.    <CaB>  *13
              delay
   ---------------------------
   block b:   ...
              ...
              ...
   ---------------------------
   block c:   ba, a c'-.     <CaB>
              ...
              seticc
              bg, pt a'-.    <CaB>  *14
              delay
===========================
   block a':  ...
              ...
              seticc
              bne, pn b-.    <MTXT> *15
              delay
   ---------------------------
   block c':  ...
              seticc
              bg, pt a'-.    <CaB>  *16
              delay
===========================
```

FIG. 27A

[BEFORE CONVERSION] AVERAGE WORD USAGE RATIO : 59.4% (9.5 WORDS/LINE)

| line | n | access | w0 | w1 | w2 | w3 | w4 | w5 | w6 | w7 | w8 | w9 | w10 | w11 | w12 | w13 | w14 | w15 | wc |
|---|---|---|---|---|---|---|---|---|---|---|---|---|---|---|---|---|---|---|---|
| 3698 | 2 | 48 | 0 | 0 | 16 | 7 | 16 | 0 | 553 | 553 | 553 | 553 | 553 | 0 | 553 | 0 | 0 | 0 | 3 |
| 3698 | 2 | 5457 | 7 | 772 | 772 | 772 | 7 | 7 | 772 | 772 | 553 | 553 | 553 | 0 | 553 | 772 | 772 | 772 | 15 |
| 3699 | 1 | 5848 | 0 | 368 | 144 | 224 | 0 | 15 | 0 | 1 | 368 | 224 | 224 | 224 | 404 | 328 | 76 | 220 | 13 |
| 3700 | 2 | 51 | 0 | 0 | 0 | 16 | 16 | 7 | 16 | 1 | 1 | 0 | 0 | 0 | 0 | 0 | 0 | 0 | 7 |
| 3700 | 2 | 3762 | 220 | 219 | 1 | 553 | 552 | 1 | 6 | 6 | 1 | 553 | 553 | 553 | 553 | 553 | 547 | 6 | 14 |
| 3701 | 1 | 6636 | 0 | 0 | 553 | 553 | 553 | 553 | 553 | 553 | 0 | 553 | 553 | 553 | 553 | 553 | 16 | 16 | 13 |
| 3702 | 2 | 112 | 0 | 0 | 0 | 0 | 0 | 0 | 16 | 16 | 16 | 0 | 16 | 0 | 16 | 16 | 16 | 0 | 7 |
| 3702 | 2 | 4466 | 0 | 0 | 0 | 0 | 0 | 0 | 6 | 6 | 553 | 553 | 553 | 553 | 553 | 553 | 553 | 553 | 15 |
| 3703 | 2 | 16 | 6 | 0 | 0 | 0 | 0 | 0 | 0 | 0 | 0 | 0 | 0 | 0 | 0 | 0 | 0 | 0 | 1 |
| 3703 | 2 | 2212 | 553 | 553 | 553 | 553 | 0 | 0 | 0 | 0 | 0 | 0 | 32 | 0 | 0 | 0 | 0 | 0 | 4 |
| 3704 | 3 | 198 | 0 | 0 | 0 | 0 | 0 | 0 | 0 | 0 | 0 | 16 | 0 | 0 | 0 | 0 | 0 | 0 | 7 |
| 3704 | 3 | 553 | 0 | 0 | 0 | 0 | 0 | 0 | 0 | 0 | 553 | 0 | 0 | 0 | 0 | 0 | 0 | 553 | 1 |
| 3704 | 3 | 90 | 0 | 0 | 0 | 0 | 0 | 0 | 0 | 0 | 0 | 0 | 0 | 0 | 0 | 0 | 60 | 0 | 2 |
| 3705 | 3 | 480 | 30 | 30 | 30 | 30 | 30 | 30 | 30 | 30 | 30 | 30 | 30 | 30 | 30 | 30 | 30 | 30 | 16 |
| 3705 | 3 | 4424 | 553 | 553 | 553 | 0 | 0 | 0 | 0 | 553 | 553 | 553 | 0 | 0 | 0 | 553 | 553 | 0 | 8 |
| 3705 | 3 | 450 | 30 | 30 | 30 | 30 | 30 | 30 | 30 | 30 | 30 | 30 | 30 | 30 | 30 | 30 | 30 | 0 | 15 |

FIG. 27B

[AFTER CONVERSION] AVERAGE WORD USAGE RATIO : 94.4% (15.1 WORDS/LINE)

| line | n | access | w0 | w1 | w2 | w3 | w4 | w5 | w6 | w7 | w8 | w9 | w10 | w11 | w12 | w13 | w14 | w15 | wc |
|---|---|---|---|---|---|---|---|---|---|---|---|---|---|---|---|---|---|---|---|
| 9742 | 1 | 101 | 7 | 7 | 7 | 7 | 7 | 7 | 7 | 7 | 3 | 4 | 7 | 7 | 7 | 7 | 7 | 7 | 16 |
| 9743 | 1 | 9275 | 553 | 553 | 553 | 553 | 553 | 0 | 553 | 553 | 772 | 772 | 0 | 772 | 772 | 772 | 772 | 772 | 14 |
| 9744 | 1 | 4307 | 772 | 368 | 144 | 224 | 224 | 404 | 328 | 76 | 220 | 220 | 219 | 1 | 553 | 552 | 1 | 1 | 16 |
| 9745 | 1 | 6639 | 553 | 553 | 553 | 553 | 553 | 553 | 553 | 553 | 553 | 553 | 553 | 553 | 553 | 563 | 0 | 553 | 15 |
| 9746 | 1 | 3913 | 553 | 553 | 553 | 553 | 547 | 6 | 6 | 0 | 6 | 6 | 6 | 6 | 6 | 6 | 553 | 553 | 15 |
| 9747 | 1 | 8848 | 553 | 553 | 553 | 553 | 553 | 553 | 553 | 553 | 553 | 553 | 553 | 553 | 553 | 553 | 553 | 553 | 16 |
| 9748 | 1 | 2787 | 2 | 2 | 0 | 2 | 2 | 2 | 2 | 2 | 2 | 2 | 2 | 2 | 2 | 2 | 2 | 2 | 16 |
| 9749 | 1 | 24 | 2 | 2 | 2 | 2 | 2 | 2 | 2 | 2 | 2 | 2 | 2 | 1 | 1 | 1 | 1 | 0 | 14 |

BINARY PROGRAM CONVERSION APPARATUS, BINARY PROGRAM CONVERSION METHOD AND PROGRAM RECORDING MEDIUM

BACKGROUND OF THE INVENTION

1. Field of the Invention

The present invention relates to a binary program conversion apparats and method for converting an original binary program into a new binary program that runs faster in a computer. Moreover, the present invention relates to a program recording medium with a program for making a computer to function as such a binary program conversion apparatus.

2. Description of the Related Art

To improve the performance of computer systems, many efforts have been made over the years to speed up the main memory. However, the development of cache memory has enabled an improvement in the performance of computer systems without speeding up the main memory.

The cache memory is a small, fast memory located between the main memory and the CPU. In the computer system having the cache memory, when a word (an instruction or data) is requested by the CPU, it is examined whether the requested word exists in the cache memory. If the requested word exists in the cache memory, the word in the cache memory is forwarded to the CPU. On the other hand, if the requested word does not exist in the cache memory, a fixed-size block of data, called a block or line, containing the requested word is retrieved from the main memory and placed into the cache memory. Then, the requested word contained in the data (line) in the cache memory is forwarded to the CPU.

That is, programs tend to reuse instructions and data which they have used recently and also tend to use words whose addresses are near one another in a short time. (Note that the former property and the latter property are called temporal locality of reference and spatial locality of reference, respectively.) In other words, the words in the main memory which the CPU will request in the near future in executing a program can be anticipated to some degree.

Since the cache memory stores such words, the CPU in the computer with the cache memory can obtain majority of words which are necessary to execute a program at the speed corresponding to not the access speed of the main memory but the access speed of the cache memory. As a result, a computer with a cache memory operates at the same speed with a system with a high-speed main memory and without a cache memory.

Moreover, since a computer with a cache memory needs a high-speed memory of small capacity, the use of the cache memory decreases the cost to construct a computer with a certain performance. Consequently, mostly of recent computers are provided with cache memories.

In addition, recent popularization of personal computers have decreased the price of the memory devices. As a result, modifying a program (software) so that the hit ratio of the main memory may increase in order to improve the performance of the computer becomes hardly significant. Because, in the computer to which many memory devices that became cheap are installed for actualizing a main memory of a large capacity, the hit ratio of the main memory is so high as not to influence the operation speed.

Therefore, for improving the performance of a computer by means of modifying a program, it is more effective to modify the program so that the hit ratio of the cache memory will be increased. That is, it becomes more important that improving the locality of reference of programs to draw out the performance of the cache memory to its maximum.

So far, to improve the hit ratio of the cache memory in a certain computer, a source program is compiled by a compiler developed for the computer. That is, to utilize this re-compile technology, each program user has to keep not only binary programs, which are programs used in practice, but also their source programs.

Moreover, since the advancement of the computer hardware is very fast and it takes time to develop a new compiler corresponding to a new computer architecture, more advanced hardware may be developed before the development of the compiler is completed. That is, there is a problem that correspondence by means of the conventional re-compile technology did not catch up with the advancement of hardware.

For these reasons, a program conversion technology which can convert a program into a new program suitable for a target computer without using its source program is wished for.

SUMMARY OF THE INVENTION

An object of the present invention is to provide a binary program conversion apparatus and a binary program conversion method which can convert an original binary program into another binary program that runs at high speed in a computer without using a source program of the original binary program.

It is another object of the present invention is to provide a program recording medium with a program for making a computer to function as such a binary program conversion apparatus.

A binary program conversion apparatus according to a first aspect of the invention is used for converting a first binary program which consists of a plural of first instruction blocks into a second binary program which is executed in a computer having a cache memory.

The binary program conversion apparatus comprises an executing part, a generating part and a producing part. The executing part executes the first binary program.

The generating part generates executed blocks information indicating first instruction blocks which are executed by the executing part.

The producing part produces, based on the executed blocks information generated by the generating part, the second binary program which contains second instruction blocks corresponding to the plural of the first instruction blocks and which causes, when being executed in the computer, the computer to store second instruction blocks corresponding to the first instruction blocks executed by the executing part at different locations of the cache memory.

Thus, the binary program conversion apparatus of the first aspect converts a binary program (first binary program) into a new binary program (second binary program) which runs fast in the computer with the cache memory by carrying out processes involves rearranging binary codes (executed blocks). Therefore, according to this binary program conversion apparatus, binary programs suitable for the computer having the cache memory can be obtained without using (managing) their source programs.

Actualization of the binary program conversion apparatus according to the first aspect involves the use of the producing part which produces the second binary program including a part in which the second instruction blocks corresponding to the first instruction blocks executed by the executing part arranged successively.

The binary program conversion apparatus according to the first aspect of the invention may further include a creating part and a controlling part. The creating part create a line data indicating lines of the cache memory which are to be used when the second binary program produced by the producing part is executed in the computer.

The controlling part controls the executing part so as to execute a third binary program which consists of a plural of third instruction blocks at first. Then, the controlling part controls the generating part so as to generate second executed blocks information indicating third instruction blocks executed by the executing part. Moreover, the controlling part controls the producing part so as to produce a fourth binary program which causes, when being executed in the computer, the computer to store fourth instruction blocks corresponding to the third instruction blocks executed by the executing part on different locations on lines of the cache memory excluding the lines indicated by the line data.

According to the thus constructed binary conversion apparatus, two binary programs (first, third binary programs), which are executed at the same time, can be converted into new two binary programs (second, fourth binary programs) which run at high speed in the computer.

The binary program conversion apparatus may further include a recognizing part which recognizes frequency of use for data access of every line of the cache memory by monitoring running states of the first binary program executed by the executing part, and the selecting part which selects, based on a recognition result of the recognizing part, lines from all lines of the cache memory to use for storing the second instruction blocks corresponding to the first instruction blocks executed by the executing part. In this case, adopted is the producing part which produces the second binary program which causes, when being executed in the computer, the computer to store the second instruction blocks corresponding to the first instruction blocks executed by the executing part on different locations on the lines selected by the selecting part.

According to the thus constructed binary conversion apparatus, a new binary program (second binary program) which causes no or little conflict miss between an instruction access and a data access can be obtained.

Furthermore, when employed is the producing part which produces the second binary program including a part in which the second instruction blocks corresponding to the first instruction blocks executed by the executing part arranged successively, the binary program conversion apparatus may be constructed by adding a searching part and a changing part.

The searching part searches from the binary program produced by the producing part a second instruction block containing on its end a conditional branch instruction whose branch destination is set for a next second instruction block. The changing part changes a branch condition and the branch destination of the conditional branch instruction so that a transition from the second instruction block searched by the searching part to the next second instruction block takes place without branching.

According to the thus constructed binary conversion apparatus, a new binary program (second binary program) which runs at higher speed can be obtained.

A binary program conversion apparatus according to a second aspect of the invention is used for converting a first binary program into a second binary program which is executed in a computer.

The binary program conversion apparatus according to the second aspect comprises a searching part and a producing part. The searching part for searching from the first binary program first instruction strings each of which consists of at least one predetermined instruction code. The producing part for producing the second binary program by replacing the respective instruction strings searched by the searching part with second instruction strings assigned to the first instruction strings.

Thus, the binary program conversion apparatus of the second aspect converts a original binary program (first binary program) into a new binary program (second binary program) which runs fast in the target computer by replacing instruction strings in the original binary program. Therefore, according to this binary program conversion apparatus, binary programs suitable for the target computer can be obtained without using (managing) their source programs.

Note that, the binary conversion apparatus of the present invention may be realized by running a corresponding program recorded in a program medium in a conventional computer.

A binary program conversion method according to a first aspect of the invention is used for converting a first binary program which consists of a plural of first instruction blocks into a second binary program which is executed in a computer having a cache memory.

The binary program conversion method according to the first aspect comprises an executing step, a generating step and a producing step. In the executing step, the first binary program is executed. In the generating step, executed blocks information indicating first instruction blocks executed in the executing step is generated. In the producing step, based on the executed blocks information generated in the generating step, the second binary program is generated which contains second instruction blocks corresponding to the plural of the first instruction blocks of the first binary program and which causes, when being executed in the computer, the computer to store the second instruction blocks corresponding to the first instruction blocks executed in the executing step on different locations of the cache memory.

The binary program conversion method according to the first aspect may adopt the producing step which involves producing the second binary program including a part in which the second instruction blocks corresponding to the first instruction blocks executed in the executing step arranged successively.

It is feasible to further add, to the program conversion method, a creating step and a controlling step. The creating step involves a process of creating a line data indicating lines of the cache memory which are to be used when the second binary program produced in the producing step is executed in the computer. The controlling step involves processes of controlling the executing step so as to execute a third binary program which consists of a plural of third instruction blocks, and of controlling the generating step so as to generate second executed blocks information indicating third instruction blocks executed in the executing step, and of controlling the producing step so as to produce, based on the second executed blocks information and the line data, a fourth binary program which contains fourth instruction blocks corresponding to the plural of the third instruction blocks and which causes, when being executed in the computer, the computer to store the fourth instruction blocks corresponding to the third instruction blocks executed by said executing means at different locations on lines of the cache memory excluding the lines indicated by the line data.

It is possible to further add, to the binary program conversion method according to the first aspect of the invention, a recognizing step and a selecting step.

The recognizing step involves a process of recognizing frequency of use for data access of every line of the cache memory by monitoring running states of the first binary program executed in the executing step. The selecting step involves a process of selecting lines from all lines of the cache memory to use for storing second instruction blocks based on a recognition result of the recognizing step. Incidentally, in this case, there is employed the producing step involves producing the second binary program which causes, when being executed in the computer, the computer to store second instruction blocks corresponding to the first instruction blocks executed in the executing step on different locations on the lines selected in the selecting step.

It is desirable to add a searching step and a changing step to the binary program conversion method in which adopted is the producing step involving a process of producing the second binary program including a part in which the second instruction blocks corresponding to the first instruction blocks executed in the executing step arranged successively.

The searching step involves a process of searching a second instruction block containing on its end a conditional branch instruction whose branch destination is set for a next second instruction block. The changing step involves a process of changing a branch condition and the branch destination of the conditional branch instruction so that a transition from the second instruction block searched in the searching step to the next second instruction block takes place without branching.

A binary program conversion method according to a second aspect of the invention is used for converting a first binary program into a second binary program which is executed in a computer. The binary program conversion method comprises a searching step and a producing step.

The searching step involves a process of searching from the first binary program first instruction strings each of which consists of at least one predetermined instruction code. The producing step of producing the second binary program by replacing the respective instruction strings searched in the searching step with second instruction strings assigned to the first instruction strings.

BRIEF DESCRIPTION OF THE DRAWINGS

Other objects and advantages of the present invention will become apparent during the following discussion in conjunction with the accompanying drawings, in which;

FIG. 2 is an explanatory diagram of a text table created by a trace analyzer in the binary program conversion apparatus of the embodiment;

FIG. 3 is an explanatory diagram of a data use line table created by the trace analyzer;

FIG. 4 is an explanatory diagram of a line table created by a cache allocator in the binary program conversion apparatus;

FIG. 17 is explanatory diagram showing the principle of the operation procedure of the binary program conversion apparatus in converting two binary programs that are executed at the same time;

FIGS. 19–26 are partial program lists for explaining the operation procedure of the binary program conversion apparatus;

FIGS. 27A, 27B are explanatory diagrams showing how the cache memory is used when executing binary programs before conversion and after conversion.

DETAILED DESCRIPTION OF THE PREFERRED EMBODIMENT

The present invention will now be described with reference to the accompanying drawings.

The binary program conversion apparatus in an embodiment converts a binary program into another binary program which runs at a high speed in a target computer having a cache memory. The binary program conversion apparatus is functionally realized by installing a program, which is stored in a recording medium like a CD-ROM, to the target computer.

Therefore, before discussing the operation procedure of the binary program conversion apparatus, the construction and the architecture of the computer used in the embodiment will be described.

The computer has the cache memory of 1 Mbytes divided into lines each of which consists of successive 64 bytes. Namely, the cache memory consists of 16384 (=1 Mbytes/64 bytes) lines. The 16384 lines are managed with using line numbers from 0 to 16383, respectively.

Moreover, the computer used in the embodiment is supported with the virtual memory. That is, virtual addresses from the CPU are translated into physical addresses used for accessing the main memory or the cache memory.

In the computer, when an instruction/data of one byte is requested by the CPU, it is examined whether the instruction/data exists in the cache memory. If the instruction/data does not exist in the cache memory, a data of 64 bytes in the main memory which contains the instruction/data is retrieved from the main memory and placed in the cache memory. Then, the instruction/data contained in the retrieved data in the cache memory is forwarded to the CPU.

The line where the retrieved data containing the requested instruction/data is stored is uniquely decided from the virtual address of the requested instruction/data. Concretely, the remainder into which the virtual address is divided by the cache memory size is used as the index of the line for storing the retrieved data.

Hereinafter, assuming that the computer has the construction and the architecture as described above, the operation of the binary program conversion apparatus in the embodiment is explained. Note that, in the following discussions, a source program (or source code) compiled is denoted as an object program and a file which stores an object program is denoted as an object file. A program, which is executable on the computer, obtained by linking one or more object programs is denoted as an executable object program. Moreover, a binary program will be used generically of an object program and an executable object program.

First of all, the outline of operating procedure of the binary program conversion apparatus is explained by exemplifying a case where one executable object program is converted.

Figure 1:
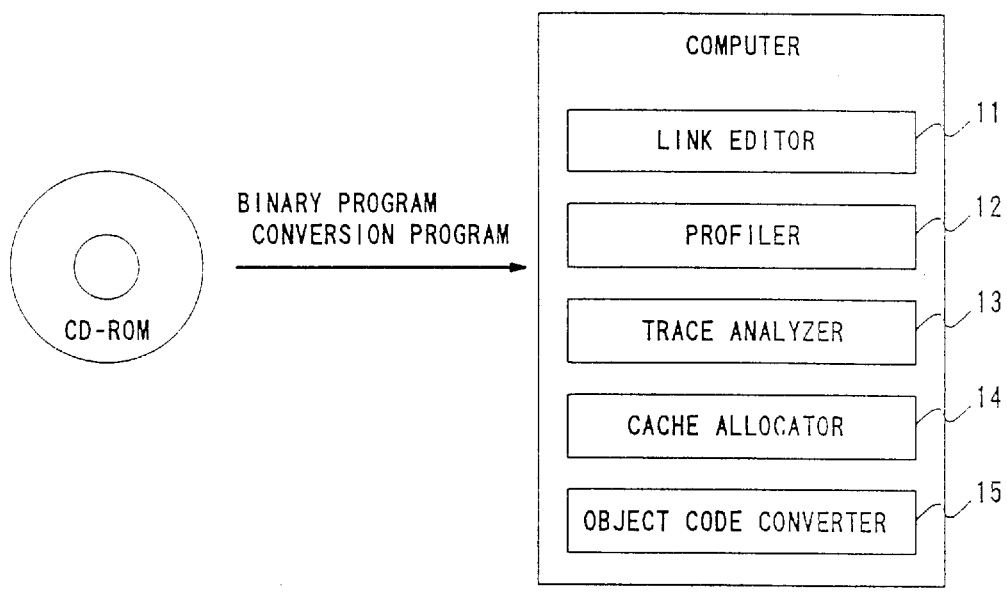
FIG. 1 is an explanatory diagram illustrating a construction of the binary program conversion apparatus in an embodiment of the present invention.

As explained above, the binary program conversion apparatus is functionally realized by installing the binary program conversion program developed for this apparatus into the computer. When running the installed binary program conversion program, the computer starts to function as the binary program conversion apparatus consists of a link editor 11, a profiler 12, a trace analyzer 13, a cache allocator 14, and an object code converter 15 as schematically shown in FIG. 1.

The link editor 11 adds a cache blocking area (hereinafter referred to as CaB area) of the same size as the cache memory (1 MB in the embodiment) to an executable object program to be converted. Concretely, the link editor 11 links a pseudofunction to secure the CaB area (details are described later) with the executable object program to be converted, thereby creating another executable object program. The link editor also stored relocation information (address constants) in the executable object program to enable complete relocation by the object code converter 15. Note that, in the following explanations, an area except the CaB area in the executable object program generated by the link editor 11 will be denoted as the MTXT area.

The profiler 12 traces (executes) the executable object program in which the CaB area is secured and creates an execution profile which contains information on the instruction codes that are executed.

The trace analyzer 13 analyzes the execution profile created by the profiler 12 and creates a text table and a data use line table. The text table is a table which holds information necessary for converting the executable object program. More concretely, it holds records each of which consists of 10 items as shown in FIG. 2. The data use line table holds records each of which consists of cache line number ("LINE") and number of times the line, identified by the cache line number, is used for storing data ("USE") as shown in FIG. 3.

The cache allocator 14 recognizes a volume (size) necessary to store all instruction blocks in the MTXT area executed by the profiler 11 based on the information in the text table created by the trace analyzer 13. Then, the cache allocator 14 determines L which is the minimum number of the cache lines necessary for holding the executed instruction blocks and selects the first L lines having the lowest frequencies of use by data access based on the information in the data use line table. Next, the cache allocator 14 classifies the selected lines into some groups each consist of consecutive lines, and create a line table containing information which indicates the classified groups. Concretely, the cache allocator 14 creates a line table containing records each of which includes starting line number ("FROM"), ending line number ("TO"), and number of lines ("NUM") of an area consists of consecutive lines as shown in FIG. 4.

Note that, when the size necessary to store all instruction blocks executed is larger than the size of the cache memory, the cache allocator 14 performs a processing different from the processing explained above. Details of the processing are described later.

After the line table is created, the object code converter 15 starts a processing for converting the executable object program.

In converting the executable object program, the object code converter 15 copies instruction blocks executed by the profiler 12 into areas within the CaB area which correspond to the cache lines selected by the cache allocator 14 based on the information in the text table and the line table. Then, the object code converter 15 writes on the starting location of each instruction block whose copy is made in the CaB area an unconditional branch instruction which cause a branch to the origin of the copy in the CaB area. Furthermore, the object code converter changes target offset/addresses of CTIs (Control Transfer Instruction; branch, call, jmpl, etc.) That is, the object code converter 14 modifies the object program so that the copies in the CaB area are executed.

The executable object program generated thus runs faster than the executable object program before conversion. The reason is described below.

Figure 5:
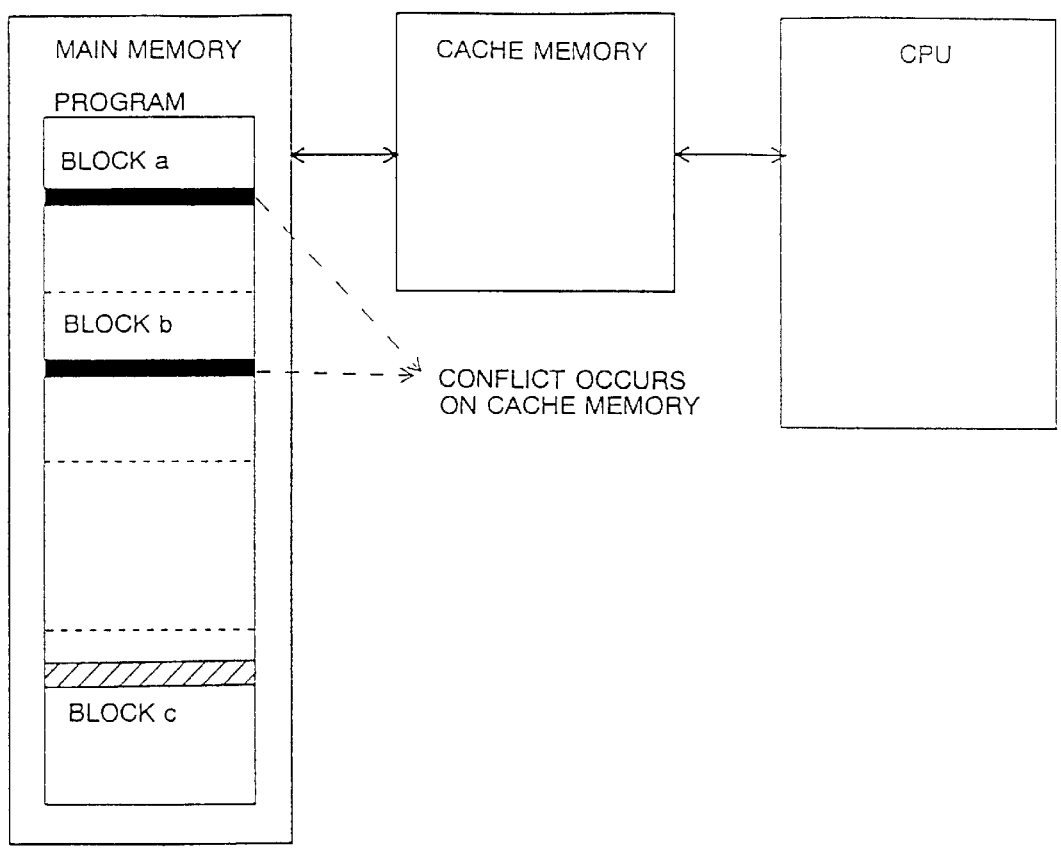
FIG. 5 is an explanatory diagram of a binary program to be converted by the binary program conversion apparatus.

For example, it is assumed that an executable object program containing three instruction blocks a, b, and c which are executed under an operational condition is given to the binary program conversion apparatus for conversion. It is also assumed that the instruction blocks a and b exists in the locations which corresponds to the same line in the cache memory as illustrated in FIG. 5.

Figure 6:
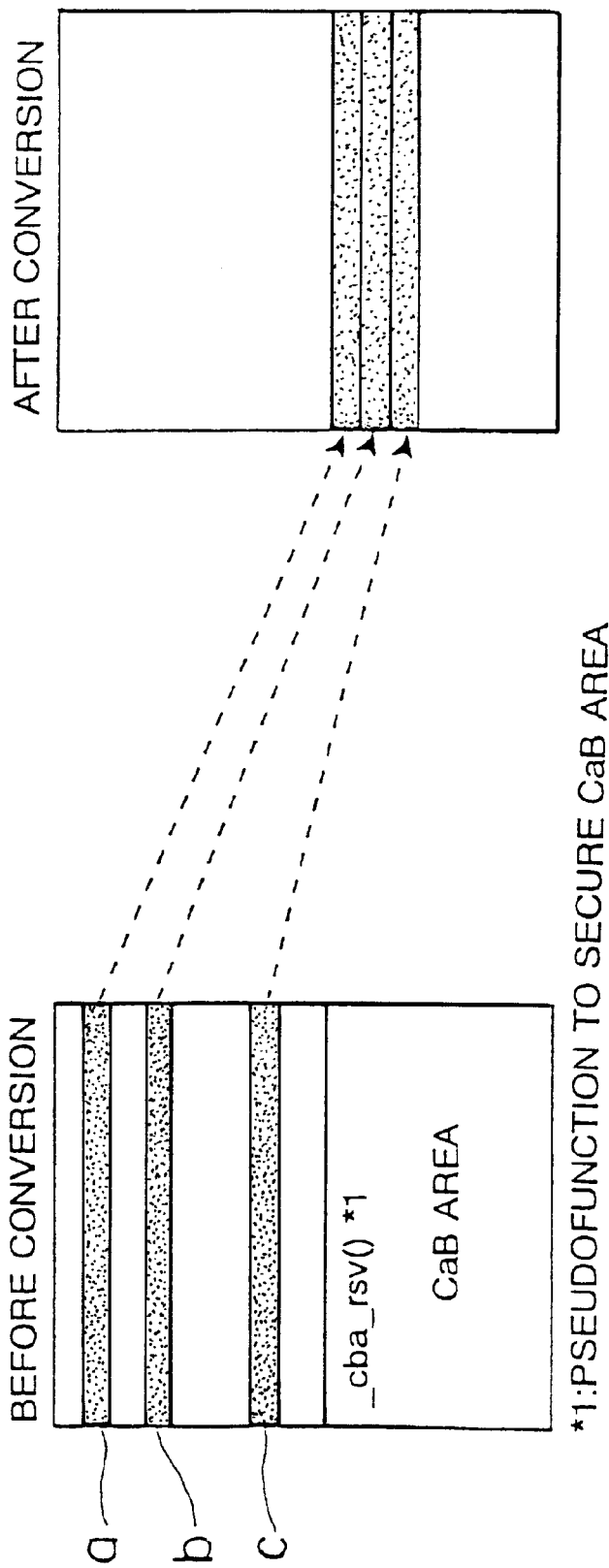
FIG. 6 is an explanatory diagram showing the principle of operation procedure of the binary program conversion apparatus.

In this case, the binary program conversion apparatus, as schematically shown in FIG. 6, copies the instruction blocks a, b and c in the CaB area, thereby generating a new executable object program whose instruction blocks in the CaB area are executed. That is, the binary program conversion apparatus generates the executable object program whose instruction block a, b and c will be stored in the different lines of the cache memory.

Consequently, when running the executable object program generated by the binary program conversion apparatus, no hit-miss in the cache memory due to the conflict between the instruction accesses occurs. As a result, the converted executable object program runs faster than the original executable object program.

Next, the operating procedure of the binary program conversion apparatus is explained more in detail by exemplifying a case where two executable object programs A and B that are executed at the same time are converted.

Figure 7:
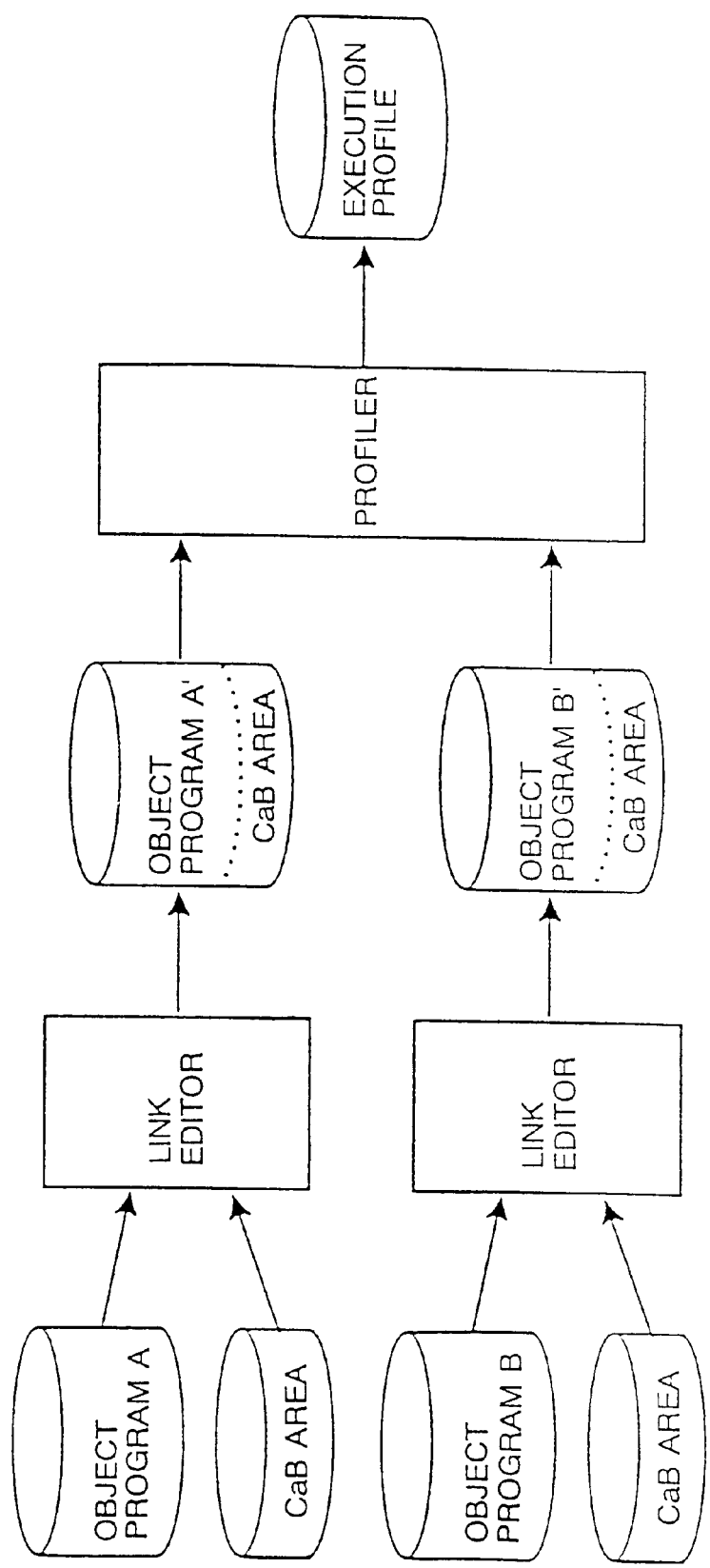
FIG. 7 is an explanatory diagram showing the first half of the operation procedure of the binary program conversion apparatus in converting two binary programs that are executed at the same time.

In this case, as schematically shown in FIG. 7, the link editor links pseudofunctions to secure the CaB areas with the executable object programs A and B, thereby generating executable object program A' and B' each of which has a CaB area. At this time, to enable complete relocation by the object converter, the link editor stored relocation information (address constants) in each executable object program.

Then, the profiler traces the executable object program A' and B' individually or simultaneously and create an execution profile including information on the instruction codes executed.

Figure 8:
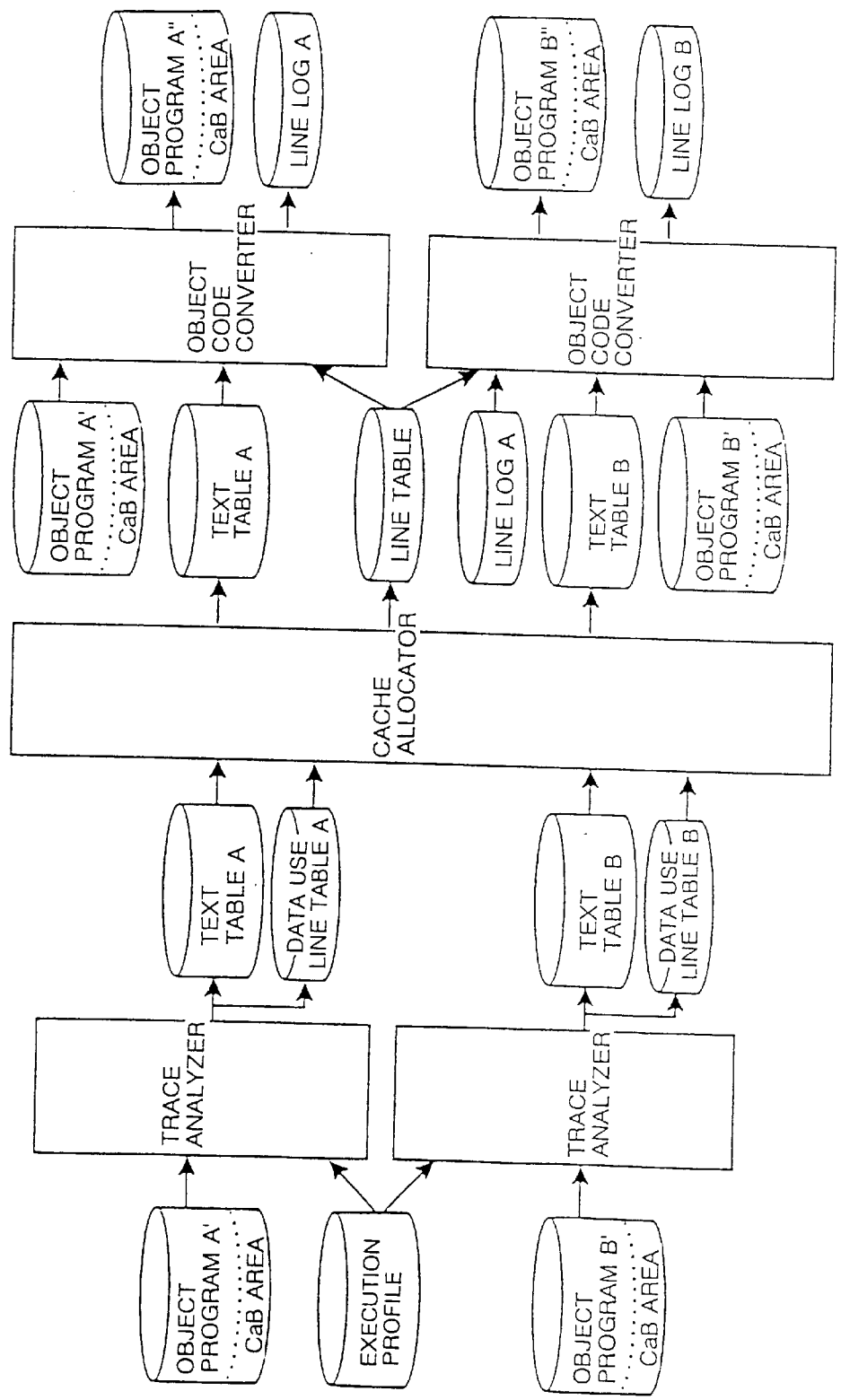
FIG. 8 is an explanatory diagram showing the latter half of the operation procedure of the binary program conversion apparatus in converting two binary programs that are executed at the same time.

After the creation of the execution profile, as shown in FIG. 8, the trace analyzer creates text tables A and B, and data use line tables A and B based on the information in the execution profile.

Thereafter, based on the information in the text tables A and B, the cache allocator determines total size of the executed instruction blocks in the executable object program A' and B'. Then, if the total size is smaller than the size of the cache memory (CaB area; 1 MB in the embodiment), the cache allocator selects the cache lines to utilize for holding all executed instruction blocks based on the information in the data use line table A and B. Next, it classifies area which consists of the selected cache lines into consecutive line areas and creates a line table which contains one or more records each indicating one consecutive line area.

On the contrary, if the total size of the executed instruction blocks is larger than the size of the cache memory, the cash allocator creates the line table having one record which consists of the starting line number, the ending line number, and the number of lines of the cache memory without selecting the cache lines. Moreover, the cache allocator selects the instruction blocks to be copied into the CaB from all executed instruction blocks and changes the content of the text tables A and B to inform the object code converter of the selection result.

Figure 9:
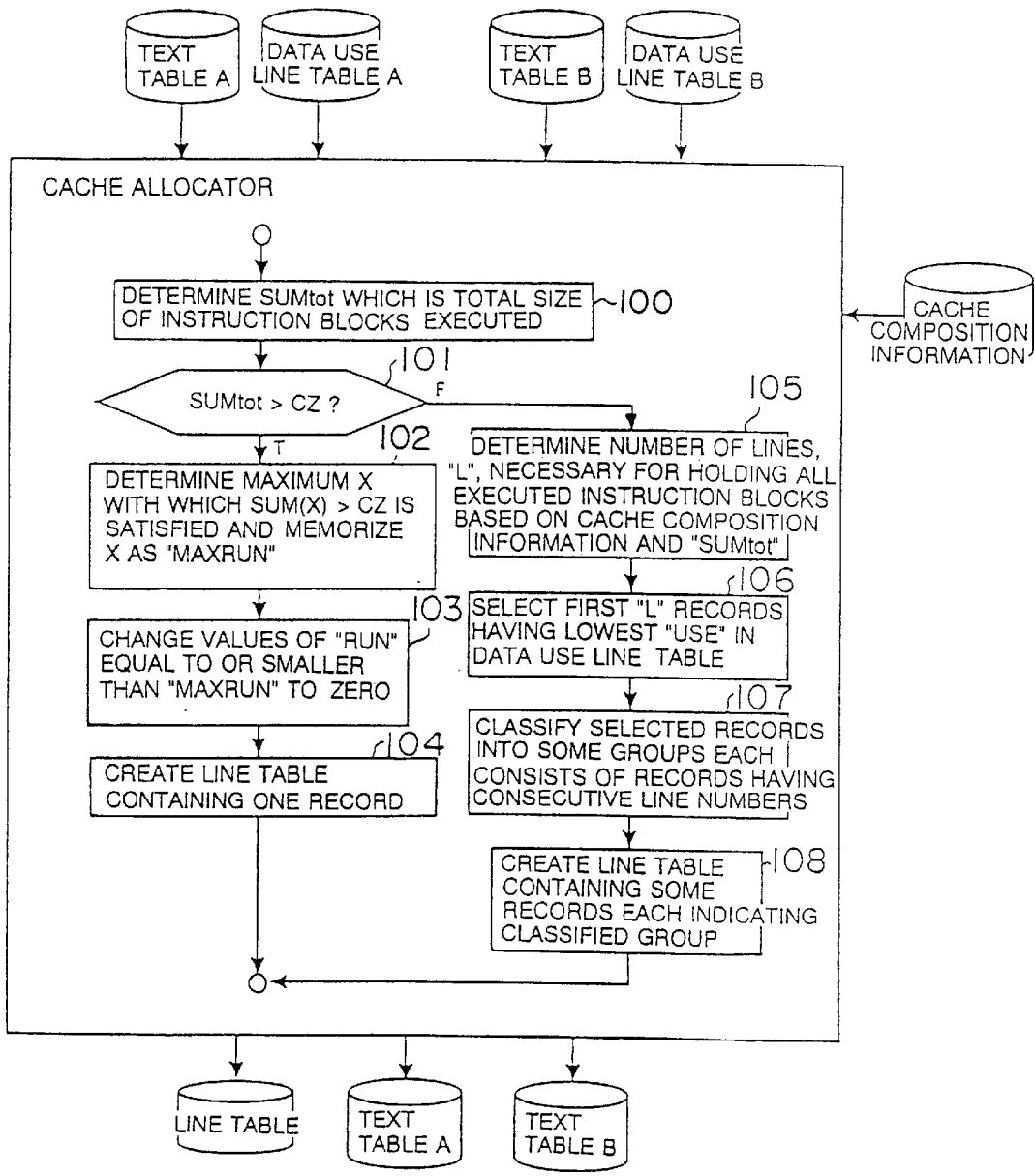
FIG. 9 is a flowchart showing the operation procedure of the cache allocator.

More concretely, as shown in FIG. 9, the cache allocator first determines SUMtot which is the sum of the sizes of the instruction blocks executed by the profiler based on the information in all text tables (step 100). Then, the cache allocator judges whether SUMtot>CZ is satisfied (step 101). Here, CZ is the size of the cache memory.

When SUMtot>CZ is satisfied (step 101:T), the cache allocator determines a maximum X with which SUM(X) >CZ is satisfied, and memorizes X as MAXRUN (step 102). Here, SUM(X) is the sum of the size of the instruction blocks which were executed at least X times. Note that, the cache allocator determines MAXRUN as follows. The cache allocator first retrieves the records concerning the instruction blocks from all text tables. Next, it sorts the retrieved records in descending order using RUN as the key so that SUM(X) may be computed by summing up values of SZ of the first some records of the sorted records. Then, the cash allocator computes SUM(X) decreasing the value of X and memorizes the value of X which satisfies the inequality SUM(X) >CZ for the first time as MAXRUN.

After determining MAXRUN, the cache allocator changes values of RUN, which are equal to or smaller than MAXRUN, in the records concerning the instruction block to "0" (step 103). Then, the cache allocator creates a line table containing one record which consists of the starting line number, the ending line number, and the number of lines of the cache memory (step 104). Namely, the cache allocator creates the line table containing one record in which values of FROM, TO, and LINE are set with 0, 16383, and 16384, respectively. After creating the line table, the cache allocator terminates the processing shown in the Figure.

On the other hand, when SUMtot>CZ is not satisfied (step 101:F), the cache allocator determines number of lines, L, necessary for holding all instruction blocks executed by the profiler based on the cache composition information (line size) and SUMtot (step 105). Then, the cache allocator sorts the records in all data use line tables in the ascending order using USE as the key to select the first L records having the lowest USE (step 106).

After the selection of L records, the cache allocator sorts the records in the ascending order using the line number (LINE) as the key and classifies the sorted records into some groups each of which consists of one or more records having consecutive line numbers. Then, it determines the starting line number, the ending line number, and the number of lines of the consecutive line area indicated by the records in each groups (step 107).

Thereafter, the cache allocator creates a line table (see FIG. 4) in which records each of which consists of the starting line number, the ending line number, and the number of lines of a consecutive line area are placed in descending order of the number of the lines (step 108) and terminates the processing.

After the line table is created, the object code converter starts a process for converting the executable object program A' and B'.

As illustrated in FIG. 8, when converting the executable object program A' which is the first program to be converted, the object code converter uses the text table A' and the line table. On the other hand, when converting the executable object program B' which is the second program to be converted, the object code converter uses the text table B', the line table, and a line log A that has been created in the converting process for the executable object program A'.

Hereafter, the details of the conversion process executed by the object code converter is explained with reference to FIGS. 10 through 16.

Figure 10:
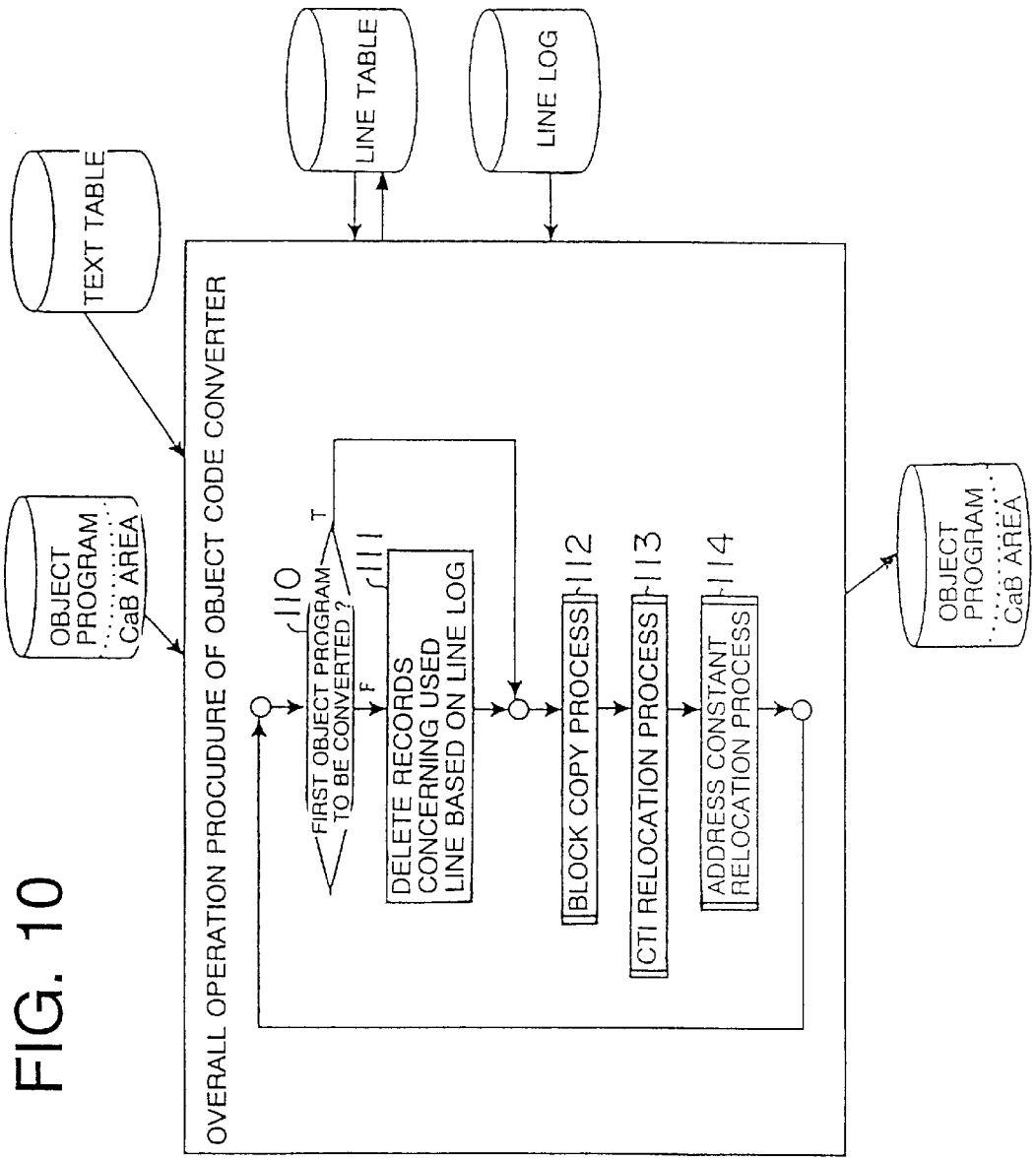
FIG. 10 is a flowchart showing the overall operation procedure of an object code converter in the binary program conversion apparatus.

When starting the conversion process, the object converter, as shown in FIG. 10, first judges whether the executable object program to be processed is the first program to be converted (step 110). When the object program is the first program (step 110:T), the object code converter executes a block copy process (step 112), a CTI relocation process (step 113), and an address constant relocation process (step 114) one by one.

Figure 11:
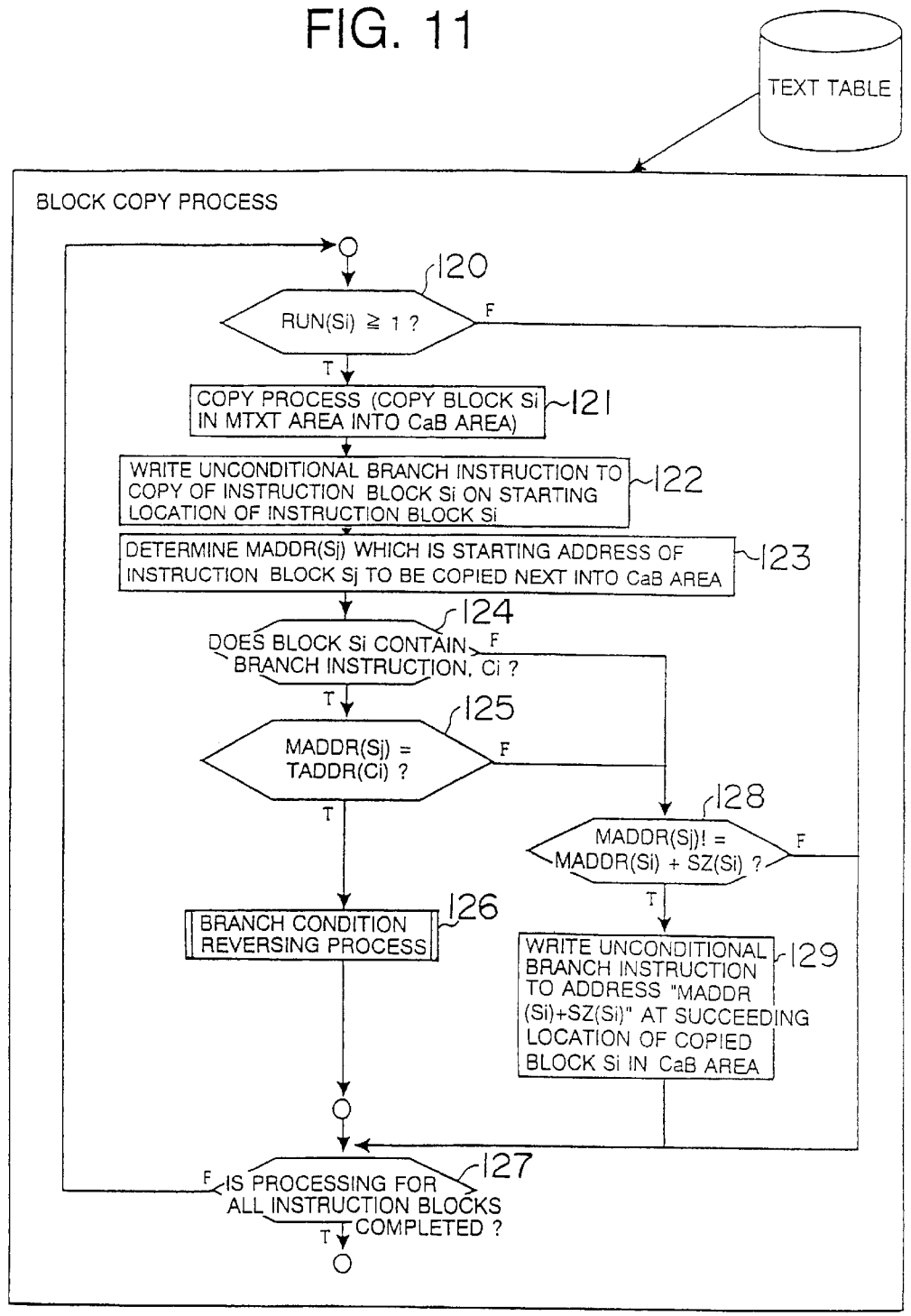
FIG. 11 is a flowchart of a block copy process carried out by the object code converter.

FIG. 11 shows the operation procedure of the object code converter in the block copy process. When starting the block copy process, the object code converter selects one record for a instruction block in the text table and judges whether RUN(Si)≧1 is satisfied (step 120). Here, Si represents an instruction block to which the selected record relates, and RUN(Si) represents a value of RUN (number of times instruction block is executed) in the selected record.

When RUN(Si)≧1 is not satisfied (step 120:F), the object code converter judges whether or not processing for all instruction blocks is completed (step 127). When processing for all instruction blocks is not completed (step 127:F), the object code converter returns to step 120 and starts processing for the next instruction block.

When RUN(Si)≧1 is satisfied (step 120:T), the object code converter executes a copy process (step 121) in order to copy the instruction block Si in the MTXT area into the CaB area.

Figure 12:
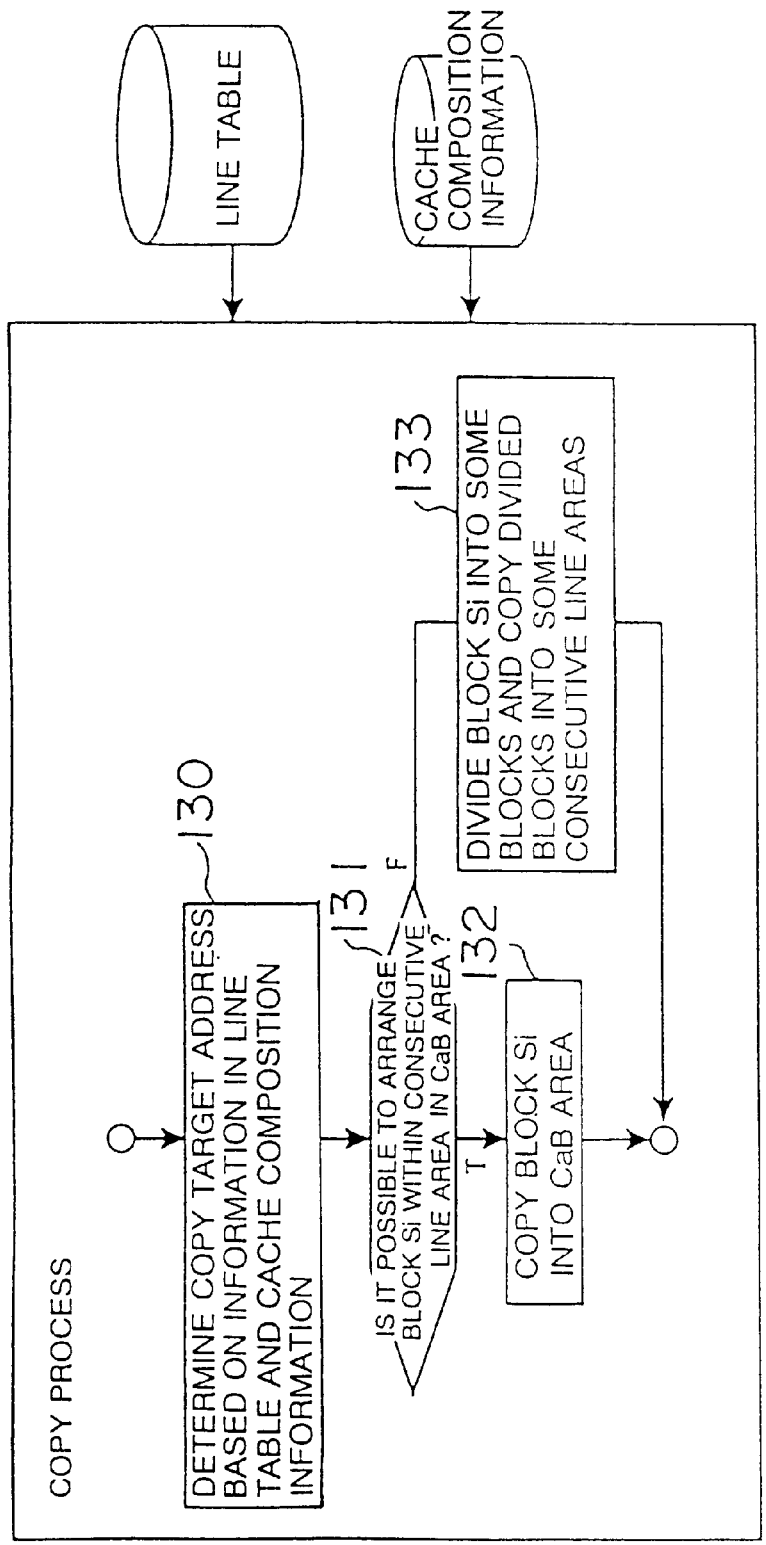
FIG. 12 is a flow chart of a copy process carried out by the object code converter.

FIG. 12 shows the operation procedure of the object code converter in the copy process. When starting the copy process, the object code converter first determines a copy target address, from which the instruction block Si is to be copied, based on the information in the line table and the cache composition information (step 130). Then, the object code converter judges whether the instruction block Si can be arranged on a consecutive area within the CaB area which includes the copy target address and corresponds to the consecutive line area indicated by one record in the line table (step 131). When the instruction block Si can be arranged in (step 131:T), the object code converter copies the instruction block Si into the consecutive area (step 132) and terminates the copy process.

When the instruction block Si cannot be arranged in the consecutive area (step 131:F), the object code converter divides the instruction blocks Si into some blocks and copies the divided blocks into some consecutive areas (step 133). In this step, when copying each divided block except the last divided block, the object code converter writes an unconditional branch which causes a branch to the next consecutive area to be used for holding the next divided block on an ending location of the consecutive area in which the divided block is copied. Then, it terminates the copy process.

After completing the copy process, the object code converter, as shown in FIG. 11, writes an unconditional branch instruction which causes a branch to the instruction block Si in the CaB area on the starting location of the instruction block Si in the MTXT area (step 122).

Next, the object code converter determines the instruction block Sj which will be copied into the CaB area next, and computes MADDR(Sj) which is the starting address of the instruction block Sj (step 123). Then, the object code converter judges whether a branch instruction Ci is included in the block Si (step 124).

When no branch instruction is included in the instruction block Si (step 124:F), the object code converter judged whether MADDR(Sj)!=MADDR(Si)+SZ(Si) is satisfied (step 128). Here, SZ(Si) is the size of the instruction block Si. When MADDR(Sj)!=MADDR(Si)+SZ(Si) is satisfied (step 128:T), the object code converter writes an unconditional branch instruction which cause a branch to the address "MADDR(Si)+SZ(Si)" at the location next to the copied instruction block Si in the CaB area (step 129) and proceeds to step 127. On the other hand, when MADDR(Sj)!=MADDR(Si)+SZ(Si) is not satisfied, that is, MADDR(Sj)=MADDR(Si)+SZ(Si) is satisfied (step 128:F), the object code converter proceeds to step 127 without writing the unconditional branch instruction.

When a branch instruction Ci is included in the instruction block Si (step 124:T), the object code converter judges whether MADDR(Sj)=TADDR(Ci) is satisfied (step 125). Here, TADDR(Ci) is the target address (branch address) of the branch instruction Ci. When MADDR(Sj)=TADDR(Ci) is satisfied (step 125;T), the object code converter executes a branch condition reversing process (step 126).

Figure 13:
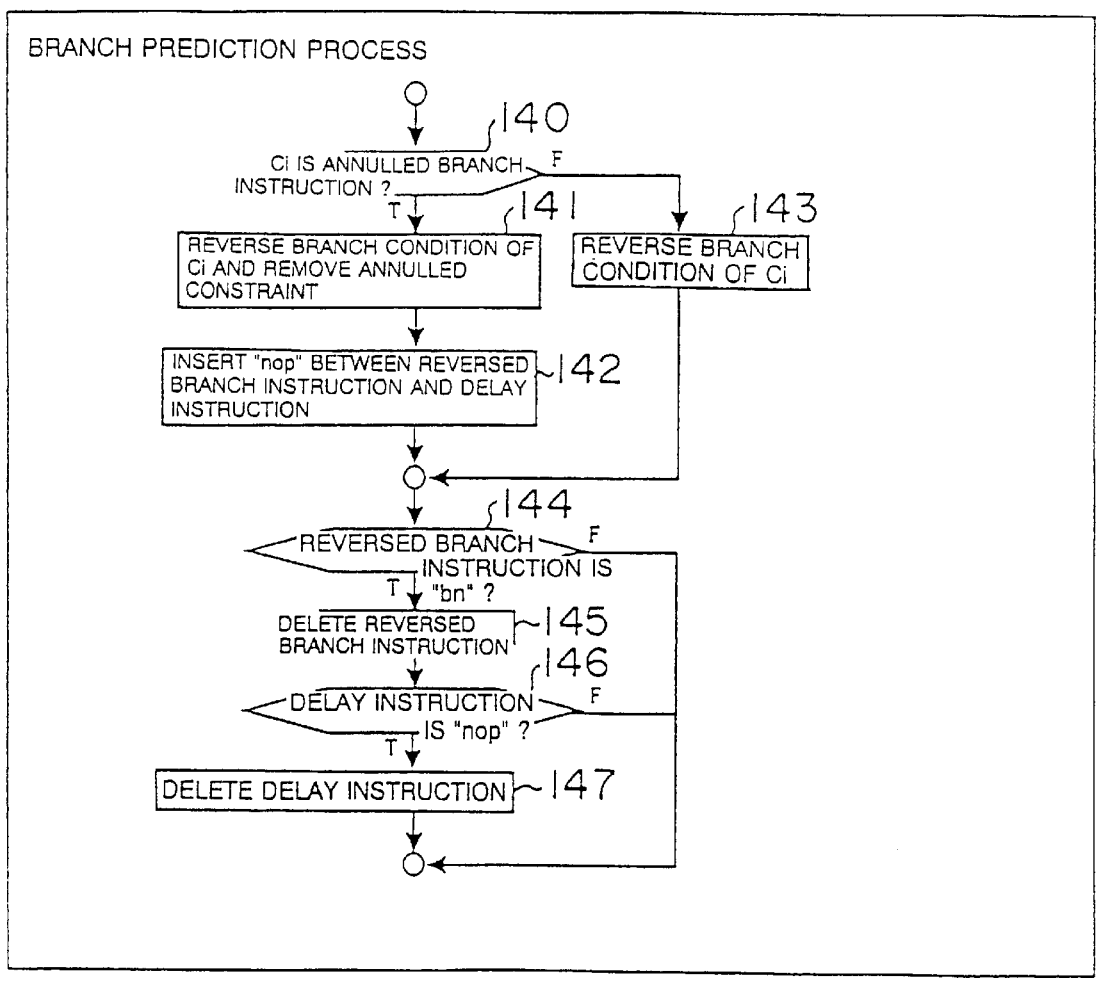
FIG. 13 is a flowchart of a branch condition reversing process carried out by the object code converter.

Hereafter, the operation procedure of the object code converter in the branch condition reversing process is explain with reference to FIG. 13. Note that, the reason why this process is carried out will be explained later.

When starting the branch condition reversing process, the object code converter first judges whether the branch instruction Ci is an annulled branch instruction (step 140). The annulled branch instruction (delay nullification branch instruction) is a branch instruction which directs the CPU to execute its succeeding instruction (delay instruction) when the branch is taken and not to execute the succeeding instruction when the branch is not taken.

When the branch instruction Ci is not an annulled branch instruction (step 140:F), the object code converter reverses the branch condition of the instruction Ci (step 143). On the other hand, when the branch instruction Ci is an annulled branch instruction (step 140:T), the object code converter reverses the branch condition of the branch Ci and removes the annulled constraint (step 141). Then, the object code converter inserts an instruction "nop" (instruction which directs the CPU to carry out no effective operation) between the branch instruction and the delay instruction (step 142).

That is, the annulled branch instruction in the original program is a instruction which causes the CPU to execute a delay instruction only when a certain condition is met. However, if only a branch condition of the annulled branch instruction is reversed, the reversed instruction causes the CPU to execute the delay instruction only when the certain condition is not met. Therefore, the object code converter removes the annulled constraint and adds the "nop" instruction, thereby generating combination of instruction codes which cause the CPU to execute the "delay" instruction only when the certain condition is met.

After executing step 142 or step 143, the object code converter judges whether the branch instruction whose branch condition is reversed is a "bn" (step 144). Here, "bn" (branch never) is a branch instruction which never causes a branch, and deleting the "bn" results in any problems. Therefore, when the branch instruction is a "bn" (step 144:T), the object code converter deletes the instruction (step 145). Then, the object code converter judges whether the succeeding instruction to the branch instruction is a "nop" (step 146). When the succeeding instruction is a "nop" (step 146; T), the object code converter deletes the instruction (step 147) and terminates the branch condition reversing process.

When the branch instruction changed is not a "bn" (step 144; F) or the succeeding instruction is not a "nop" (step 146:F), the object code converter terminates the branch condition reversing process without deleting any instructions.

After the branch condition reversing process is terminated, the object code converter, as shown in FIG. 11, proceed to step 127 and judges processing for all instruction blocks is completed. When processing for all instruction blocks is completed (step 127:T), the object code converter terminates the block copy process and starts the CTI relocation process.

Figure 14:
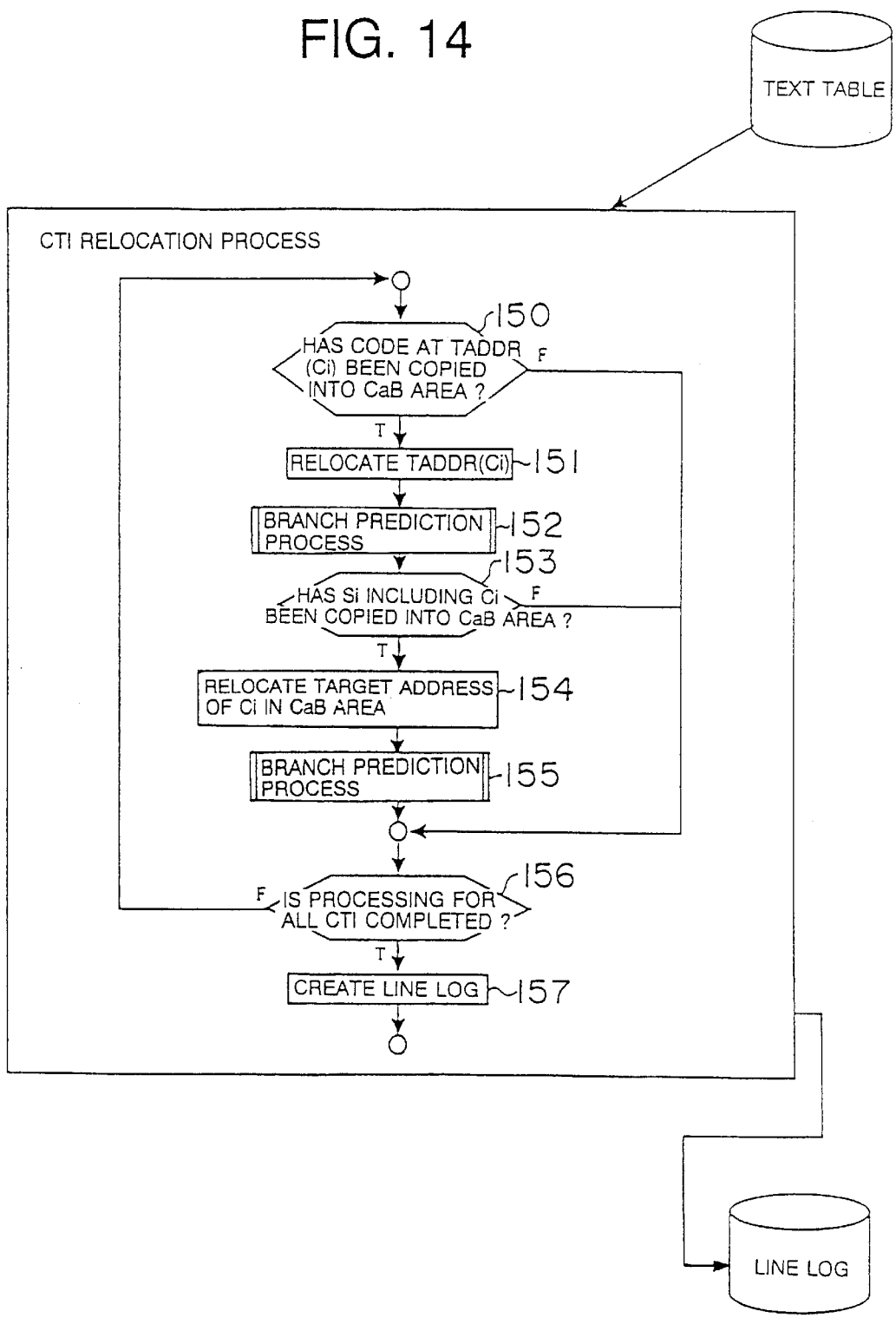
FIG. 14 is a flowchart of a CTI relocation process carried out by the object code converter.

FIG. 14 shows the operation procedure of the object code converter in the CTI relocation process.

In the CTI relocation process, the object code converter first select one record related to CTI in the text table and judges whether a code at the address TADDR(Ci) has been copied into the CaB area (step 150). Here, TADDR(Ci) is a target address of the instruction Ci to which the selected record relates.

When the code at TADDR(Ci) has been copied into the CaB area (step 150:T), the object code converter relocates TADDR(Ci) (step 151) and executes a branch prediction process (details will be described later) for the instruction Ci in the MTXT area (step 152). Then, the object code converter judges whether the instruction block Si including the instruction Ci has been copied into the CaB area (step 153). When the instruction block Si has been copied into the CaB area (step 153;T), the object code converter relocates the target address of the copy of the instruction Ci in the CaB area (step 154) and executes the branch prediction process for the instruction Ci in the CaB area (step 155).

Then, when processing for all CTIs is not completed (step 156:F), the object code converter returns to step 150 and starts processing for the next CTI. On the other hand, when processing for all CTIs is completed (step 156:T), the object code converter creates a line log which holds the information indicating the cache lines in which the instruction blocks are stored when the converted executable object program is executed (step 157) and terminates the CTI relocation process.

After terminating the CTI relocation process, the object code converter, as mentioned before (see FIG. 10), executes the address constant relocation process.

Figure 15:
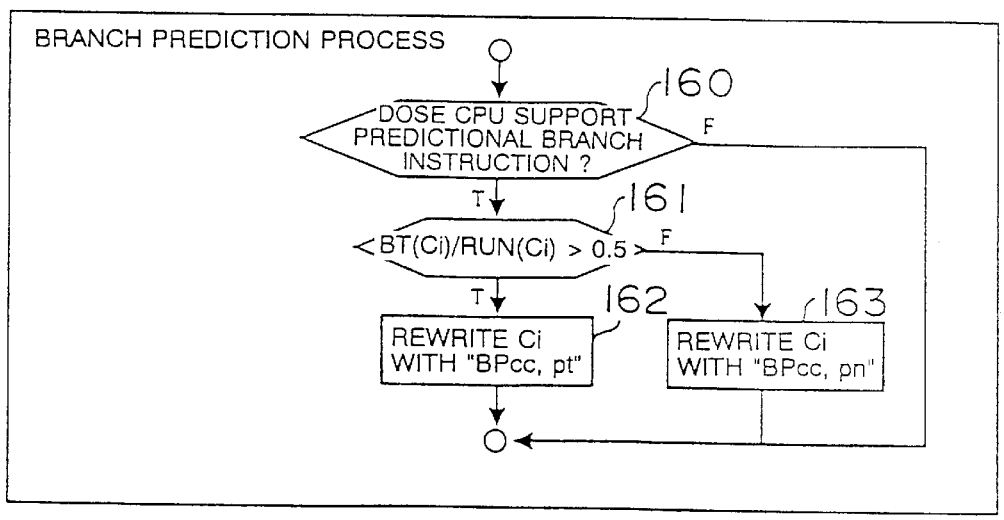
FIG. 15 is a flowchart of a branch prediction process carried out by the object code converter.

Before explaining the address constant relocation process, the branch prediction process (steps 152, 155) will be explained with reference to FIG. 15.

When starting the branch prediction process, the object code converter first judges whether the CPU in the target computer supports a predictional branch instruction (step 160). Note that, the predictional branch instruction is a branch instruction which has a prediction bit showing the probability that the branch will be taken is higher than 0.5 or not. When the predictional branch instruction with a prediction bit showing the probability is higher than 0.5, "BPcc, pt", is given, the CPU sporting the predictional branch instruction prefetches instructions which are to be executed when the branch is taken. When the predictional branch instruction with a prediction bit showing the probability is not higher than 0.5, "BPcc, pn", is given, the CPU executes the branch instruction without prefetching instruction.

When the CPU supports the predictional branch instruction (step 160;T), the object code converter judges whether BT(Ci)/RUN(Ci)>0.5 ("number of times branch instruction is taken"/"number of times branch instruction is executed">0.5) is satisfied (step 161). When BT(Ci)/RUN (Ci)>0.5 is satisfied (step 161;T), the object code converter rewrites the instruction Ci with "BPcc, pt" (step 162) and terminates the predictional branch process. On the other hand, when BT(Ci)/RUN(Ci)>0.5 is not satisfied (step 161; F), the object code converter rewrites Ci with the predictional branch instruction "BPcc, pn" (step 163) and terminates the predictional branch process.

Figure 16:
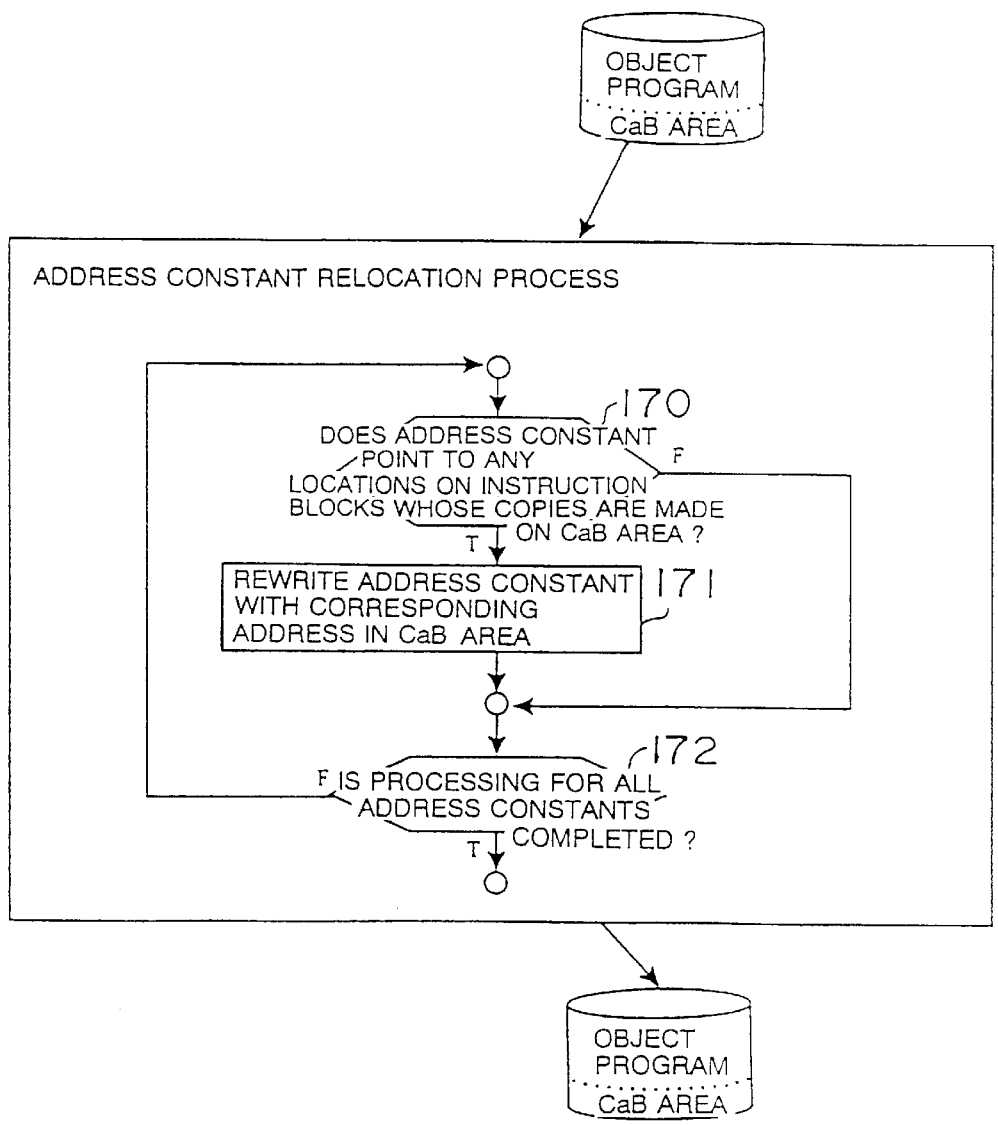
FIG. 16 is a flowchart of a relocation process carried out by the object code converter.
Figure 18:
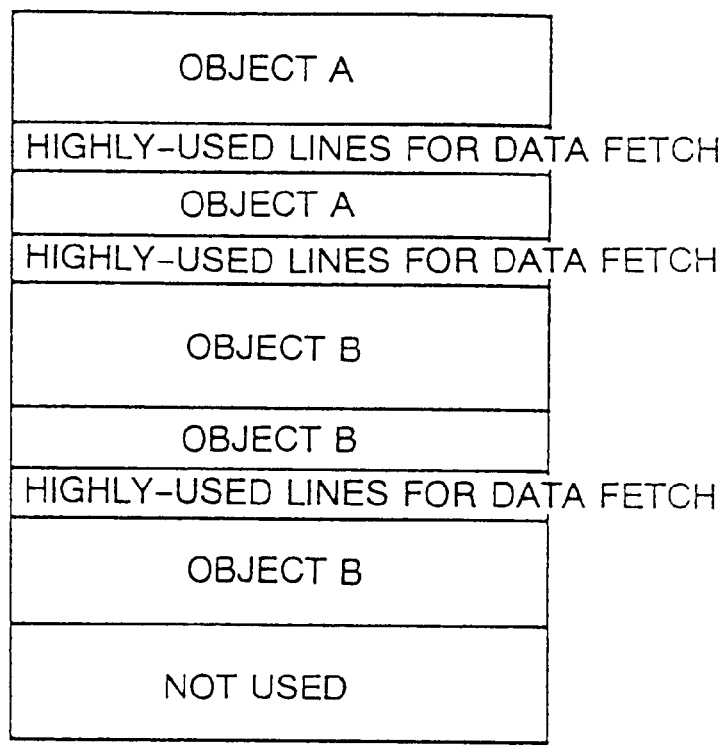
FIG. 18 is explanatory diagram showing how the cache memory is used when two executable object programs generated by the binary program conversion apparatus.

Hereinafter, the operation procedure of the object code converter in the address constant relocation process is explained with reference to FIG. 16. Note that, the address constant relocation process is carried out to prevent that control is transferred to an instruction in the MTXT area by a branch instruction conditional to a register.

When starting the address constant relocation process, the object code converter selects an address constant among the address constants which are stored in the executable object program by the link editor, and judges whether the selected address constant points to any locations on the instruction blocks whose copies are made on the CaB (step 170). When the address constant points to any of such locations (step 170:T), the object code converter rewrites the address constant with a corresponding address in the CaB area (step 171) and proceeds to step 172. On the contrary, when the address constant does not point to any of such locations (step 170:F), the object code converter proceeds to step 172 without rewriting the address constant.

In step 172, the object code converter judges whether or not processing for all address constants is completed (step 172). When processing for all address constants is not completed (step 172:F), the object code converter returns to step 170 and starts the processing for the next address constant.

When recognizing that processing for all address constants is completed (step 172:T), the object code converter terminates the address constant relocation process.

When the address constant relocation process is terminated, the conversion process for the object program A' is completed. Namely, the object program A" which runs faster than the object program A is generated. Then, the conversion process for the next executable object program B' is started as schematically shown in FIGS. 8, 10.

In this case, since the object program B' is not the first program, the object code converter proceeds to step 111 and deletes the records concerning cache lines which will be used for holding the instruction blocks in the object program A" from the line table based on the information in the line log A created in the CTI relocation process for the object program A'. After updating the contents of the line table, the object code converter executes the block copy process (step 112), the CTI relocation process (step 113), and the address constant relocation process (step 114) for the executable object program B' one by one.

Consequently, as schematically shown in FIG. 17, the executed instruction blocks in the object program B are copied into the CaB area in such a manner that the copied instruction blocks in the CaB area are, when being executed, stored in the cache lines that are not used for storing the copied instruction blocks in the object program A".

Hereafter, the operation procedure of the binary program conversion apparatus discussed above is explained more concretely using program lists shown in FIGS. 19–26. Note that, in the discussions below, it is assumed for convenience' sake that the binary program conversion apparatus (object code converter) copies all the executed instruction blocks into the CaB area before performing other processing. And notations in every program lists are based on an assembler language for a certain computer architecture.

Figure 19:
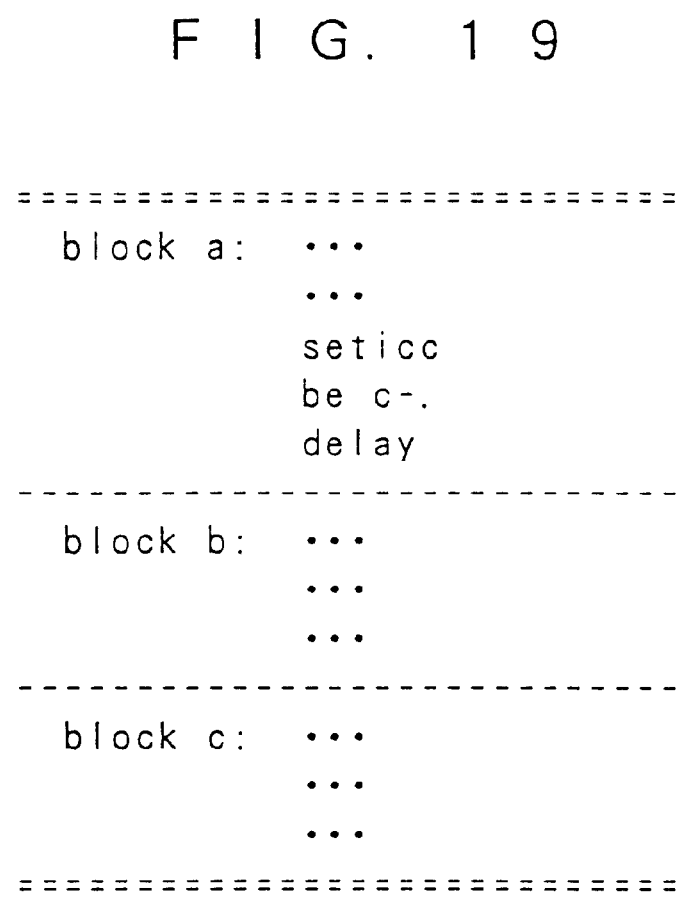

To begin with, the basic operation procedure of the binary conversion apparatus will be discussed by exemplifying a case where one executable object program whose list is shown in FIG. 19 is converted. Note that, the instruction "seticc" in the list represents an instruction for setting a condition code to which conditional branch instruction refers. The instruction "be" (branch equal) is an instruction which causes a branch when an equal condition is satisfied. The "c-." following "be" indicates that the offset value of the branch target is a value obtained by subtracting the present address (".") from the starting address of the block c. The instruction "delay" is a delay instruction which is executed at the same time with the branch instruction. The "delay" is executed even when the branch is taken. That is, after a branch instruction and corresponding "delay" are executed, an instruction of the branch target is executed.

As explained before, when a program is converted, only the instruction blocks executed by the profiler are copied into the CaB area. Therefore, if the blocks a and b in the program shown in FIG. 19 are executed by the profiler, the program is modified to the program shown in FIG. 20. That is, the program having the instruction blocks a' and b', which are the copies of instruction blocks a and b, in the CaB area is generated.

Figure 20:
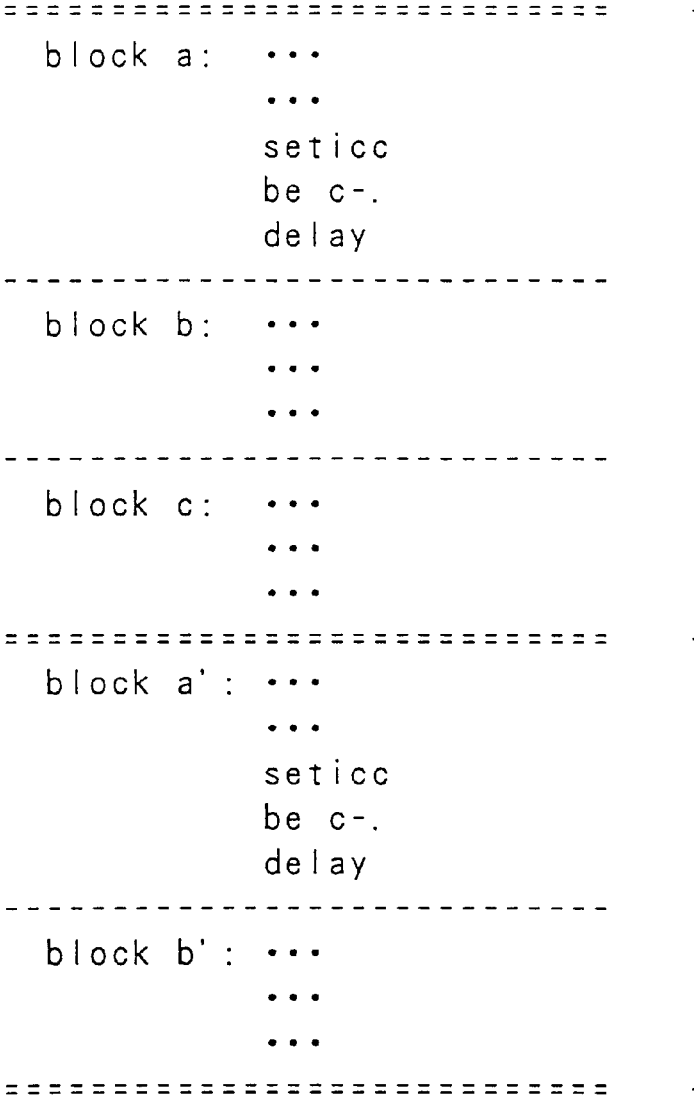

Then, relocations are carried out so that instruction block a' and b' are executed. As the result, the program shown in FIG. 20 is modified to the program shown in FIG. 21.

That is, the unconditional branch instruction "ba, a a'-." which causes a branch to the block a' in the CaB area is set at the starting address of the block a in the MTXT area (*1). Similarly, the unconditional branch instruction "ba, a b'-." which causes a branch to the block b' is set at the starting address of the block b (*2). Note that, ", a" in the instruction "ba, a a'-." or "ba, a b'-." represents that the instruction is an annulled branch instruction which cause the CPU not to execute its succeeding instruction.

Moreover, the target offset value of the branch instruction in the block a' is rewritten so that the control will be transferred to the block c in the MTXT area (*3). With respect to the block b' in the CaB area, since the block c following the block b is not copied into the CaB area, the unconditional branch instruction "ba, a c-." is added to its end (*4).

Next, the operation procedure in the branch condition reversing process is explained by exemplifying a case where the blocks a and c in the program shown in FIG. 19 are executed by the profiler.

In this case, the program shown in FIG. 19 is converted into the program shown in FIG. 22. That is, the unconditional branch instructions to the blocks a' and c' are set at the starting addresses in the blocks a and c in the MTXT area (*5,*7). Moreover, since the branch target of the branch instruction "be" in the block a is the instruction block c whose copy is made on the CaB area, the target offset value of the branch instruction is rewritten so that the branch instruction causes a branch to the instruction block c' (*6).

Furthermore, since the target of the branch instruction "be" in the block b' is the block c whose copy is made on the CaB area and at the location of the CaB area next to the block b', the instruction is substituted for the branch instruction "bne" (branch not equal) and its target offset value is rewritten so that a branch will be taken to the block b in the MTXT area (*8) in the branch condition reversing process.

Next, the operation procedure in the branch condition reversing process for a annulled branch instruction is explained by exemplifying a case where the program shown in FIG. 23 is given to the binary program conversion apparatus and the blocks a and c are executed by the profiler.

In this case, the program shown in FIG. 24 is generated by the binary program conversion apparatus. That is, with respect to the instruction blocks a and c in the MTXT area, adding the unconditional branch instructions and relocating the target offset value are carried out similarly to the case where the program does not include an annulled branch instruction (see FIG. 22).

Then, with respect to the annulled branch instruction "be, a c-." in the block a' (not shown in the figure), since its branch target (i.d. the block c) is copied in the location next to the block b', its branch condition is reversed and the annulled constraint is removed. That is, the annulled branch instruction "be, a" is substituted for the not annulled branch instruction "bne". Furthermore, the target offset value of the "bne" is rewritten so that a branch to the block b in the MTXT area will be taken (*9). In addition, the instruction "nop" is inserted between the modified branch instruction and the instruction "delay" (*10).

When the thus converted program is executed under the situation that the branch instruction "bne b-" in the block a' causes a branch, its succeeding instruction "nop" is executed, but the instruction "delay" is not executed. On the other hand, when the program is used under the situation that the branch instruction "bne b-" does not cause a branch, the instruction "delay" is executed. Thus, the program generated by the binary program conversion apparatus controls the CPU in the same manner that the original program does.

Hereinafter, the operation procedure in the branch prediction process will be explained by exemplifying a case where the program shown in FIG. 25 is given to the binary program conversion apparatus and the instruction blocks a and c in the program are executed by the profiler. Note that, in the following explanations, it is assumed that the value of BT/RUN for branch instructions (*11,*12) in the executed instruction blocks is larger than 0.5.

In this case, the program shown in FIG. 25 is converted into the program shown in FIG. 26. Namely, to begin with, copying the executed instruction blocks into CaB area, relocations, reversing branch condition of branch instructions is carried out to the program. Thereafter, the branch instructions "be" and "bg" with high probability to branch in the MTXT area in the processed program are substituted for the corresponding predictional branch instructions "be,pt" and "bg,pt", respectively (*13,*14). The copied branch instruction "bg" in the block c' is also substituted for the corresponding predictional branch instructions "bg,pt" (*16). On the other hand, with respect to the copied branch instruction in the block a', since processing to reverse the branch condition has been carried out, substitution for the predictional branch instruction "bne, pn" is performed (*15).

As discussed in detail above, the binary program conversion apparatus, when being given one or more object programs for conversion, adds a CaB area words on which will be stored in different locations in the cache memory to each of the object programs, and checks instruction blocks which will be executed. Then, if the total size of the instruction blocks which will be executed is not larger than the cache memory size, it copies part of the instruction blocks which will be executed into the CaB area and modifies some instruction codes so that the copies of the instruction blocks on the CaB area will be used. If the total size of the instruction blocks which will be executed is smaller than the cache memory size, it copies all the instruction blocks which will be executed into the CaB area so that the copies are stored in the cache lines which are not frequently used for storing data, and modifies some instruction codes so that the copies of the instruction blocks on the CaB area will be used.

Therefore, according to this binary program conversion apparatus, one or more new object programs can be obtained which have lower miss rates due to conflicts between instruction accesses than their original object programs in case where the total size of the instruction blocks that will be executed is larger than the cache memory size in the original object programs. Moreover, new object programs which causes no miss due to conflicts between instruction accesses and which also causes fewer misses due to conflicts between a instruction access and a data access can be obtained in case where the total size of the instruction blocks that will be executed is smaller than the cache memory size in their original object programs.

Furthermore, since conversion is carried out by packing the instruction blocks into the CaB area, the object program generated by the binary program conversion apparatus consumes smaller volume of the cache memory for storing unnecessary instruction blocks than the original program does. In other word, the binary program conversion apparatus generates the object program which utilizes the lines of the cache memory efficiently.

For example, by this binary program conversion apparatus, an object program by which the cache memory is utilized in a condition as shown in FIG. 27A is converted into a new object program by which the cache memory is used in a condition as shown in FIG. 27B.

Note that, in FIGS. 27A and 27B, a value in the column "line" represents a line number of cache memory and a value in the column "wi" (i=0–15) represents a number of times access to the i-th word (4 bytes) was made in the corresponding cache line. A value in the column "access" represents a sum of the numbers of times access to the 0th through 15th words was made in the corresponding cache line. A value in the column "wc" represents a number of words accessed (used) in the corresponding cache line. A value in the in the column "n" represents number of program lines which are stored in the corresponding cache line. Namely, a cache line whose value of "n" is larger than 1 is a line which was replaced several times (once at least) with another program line.

As clearly shown in FIG. 27A, when running the object program before conversion, there are cases where a cache line is used for holding a program line containing many unnecessary words (see values of "wc").

On the other hand, since the binary program conversion apparatus packs instruction blocks which will be executed within the CaB area, thereby generating a new object program, when running the generated new object program, each cache line is used for holding one program line containing no or few unnecessary words as shown in FIG. 27B. In fact, the average value of word usage ratios for the cache lines shown in FIG. 27B is 94.4% (15.1 words/line), while that for the original object program is 59.4% (9.5 words/line). Thus, the object program with high word usage ratio can be obtained by the binary program conversion apparatus.

Note that, the new object program is so generated by the binary program conversion apparatus that instruction codes which are included in the program line of the original object program relating to the row having "line" of 3698 and "wc" of 15 (the second row) in FIG. 27A will be stored in the 10th through 15th words of the cache line whose line number is 9742 and the 0th through 9th words of the cache line whose line number is 9743, and instruction codes which are included in the program line relating to the 3rd, 5th, 6th, 8th, 10th, 12th, and 15th rows and are accessed will be stored within the cache lines whose line number are 9743–9748, and the remaining instruction codes will be stored in the remaining words (words to which instruction codes are not allocated) in the cache lines with line numbers of 9742, 9728 and 9749.

In addition, the binary program conversion apparatus modifies the object program so that frequency at which control is transferred due to taking branch is lowered, and replaces some instruction codes with new, more suitable instruction codes, these modifications also increases the speed of the object program.

That is, since, in general, a control transfer to a remote address due to taking a branch needs longer time to be carried out than a control transfer to a next address, the modification for the branch instructions increases the speed of the object program. Moreover, there is often the case where an instruction code (or a combination of instruction codes) cannot be executed speedy by a target CPU, while the code (or the combination) can be executed speedy by another CPU. It is also a fact that, in such case, the target CPU generally has an alternative instruction code with the code. Consequently, the replacements of instruction codes also increases the speed of the object program.

Thus, according to the binary program conversion apparatus in the embodiment, since various optimizations are made to original binary program(s), new binary program(s) which runs at extremely high speed in the target computer can be obtained easily.

It should be noted that the binary conversion technique discussed so far can be applied to various computers besides the computer in the embodiment.

For example, the computer in the embodiment is provided with the cache memory having 16384 lines of 64 bytes. The present technique can be applied, of course, to a computer provided with a cache memory having lines of arbitrary number and sizes. Moreover, there are computers which have plural (normally two) cache memories between the CPU and the main memory. This technique can be applied to such a computer.

Furthermore, while the cache memory in the embodiment is a integrated type cache memory which stores data and instructions, the present technique can be applied to a computer provided with a so-called separated type cache memory which consists of a data cache to hold data, and an instruction cache to hold instructions. When applying the present technique to such a computer, processing related to the data use line table can be omitted, because no miss due to conflicts between an instruction access and a data access occurs in the separated type cache memory.

This technique can be applied to a computer having a set associative cache or full associative cache, while the computer in the embodiment has the direct mapped cache (which is equivalent with one way set associative cache). In such cashes, a cache line where a line containing a requested word is placed cannot be determined from an address of the requested word. But, a set (group of cache lines) where the line containing the requested word is placed can be determined from the address and the line is placed on a cache line which is in the set and not used for storing a line. Consequently, with respect to these caches, a cache line which will be used for holding the line can be specified based on the address of the requested word. Therefore, this technique can be applied to computers having set or full associative caches.

As a matter of course, this technique can be applied to a computer provided with not a virtual cache, but a physical cache in which indexing is carried out with using a physical address.

In short, this binary conversion technique can be applied to every computer in which a storing position of a requested word in the cache memory can be guessed from its address.

It should be also noted that part of this technique can be applied to a computer without a cache memory. For example, the replacement technique taught in the branch prediction process is effective to a computer without a cache memory. Because, with utilizing this technique, a original object program which contains instruction codes that are unsuitable for a target computer can be converted into a new object program which contains instruction codes that are suitable for the computer.

What is claimed is:

1. A binary program conversion apparatus, used for converting a first binary program which consists of a plurality of first instruction blocks into a second binary program which is executed in a computer having a cache memory, comprising:

executing means for executing the first instruction blocks of the first binary program after an additional area has been added to the first binary program, the additional area having a size of up to and including a size of the cache memory;

generating means for generating executed blocks information from the executed first instruction blocks; and producing means for producing the second binary program from the executed blocks information, the second binary program comprising second instruction blocks corresponding to the first instruction blocks, ones of the second instruction blocks having been copied into the addition area wherein
when the second binary program is executed in the computer, the computer stores the second instruction blocks corresponding to the executed first instruction blocks at locations where any other second instruction blocks are not stored within the cache memory, and object code of the first binary program is used during a process of converting the second binary program from the first binary program.

2. A binary program conversion apparatus according to claim 1, wherein said producing means produces the second binary program including a part in which the second instruction blocks corresponding to the executed first instruction blocks are arranged successively.

3. A binary program conversion apparatus according to claim 1, further comprising:

creating means for creating a line data indicating lines of the cache memory which are to be used when the produced second binary program is executed in the computer; and controlling means for controlling
said executing means so as to execute third instruction blocks of a third binary program,
said generating means so as to generate second executed blocks information from the executed third instruction blocks, and
said producing means so as to produce a fourth binary program from the second executed blocks information and the line data, the fourth binary program comprising fourth instruction blocks corresponding to the executed third instruction blocks, wherein
when the fourth binary program is executed in the computer, the computer stores the fourth instruction blocks corresponding to the executed third instruction blocks at locations in lines of the cache memory except the lines indicated by the line data.

4. A binary program conversion apparatus according to claim 1, further comprising:

recognizing means for recognizing a frequency of use for data access of every line of the cache memory by monitoring running states of the executed first instruction blocks of the first binary program; and selecting means for selecting from a recognition result of said recognizing means lines having the lowest frequency of use from all lines of the cache memory to use for storing the second instruction blocks corresponding to the executed first instruction blocks, and wherein said producing means produces the second binary program which causes, when being executed in the computer, the computer to store the second instruction blocks corresponding to the executed first instruction blocks at locations in the lines selected by said selecting means.

5. A binary program conversion apparatus according to claim 2, further comprising:

searching means for searching from the second binary program a second instruction block containing on its end a conditional branch instruction whose branch destination is set for a next second instruction block; and changing means for changing a branch condition and the branch destination of the conditional branch instruction so that a transition from the searched second instruction block to the next second instruction block takes place without branching.

6. A binary program conversion apparatus according to claim 1, wherein said producing means produces the second binary program which causes, when being executed in the computer, the computer to store the second instruction blocks in the cache memory when the total size stored is within cache memory size, and wherein the second instruction blocks are selected according to the executing frequency of each block.

7. The binary program conversion apparatus according to claim 1, wherein said producing means produces the second binary program without using a symbol table of the first binary program.

8. The binary program conversion apparatus according to claim 1, further comprising securing means for securing the additional area in the first binary program, wherein said executing means executes the first binary program having the secured additional area, and said producing means further comprises copying ones of the first instruction blocks into the secured additional area of the first binary program using the executed blocks information such that the copied ones of the first instruction blocks in the secured additional area are executed.

9. The binary program conversion apparatus according to claim 1, wherein ones of the first instruction blocks correspond to a same line in the cache memory, and ones of the second instruction blocks corresponding to the ones of the first instruction blocks correspond to different respective lines in the cache memory.

10. A binary program conversion method, used for converting a first binary program having first instruction blocks into a second binary program which is executed in a computer having a cache memory, comprising:

executing the first instruction blocks of the first binary program after an additional area has been added to the first binary program, the additional area having a size of up to and including a size of the cache memory;

generating executed blocks information from the executed first instruction blocks; and producing the second binary program from the executed blocks information, the second binary program comprising second instruction blocks corresponding to the first instruction blocks of the first binary program, ones of the second instruction blocks having been copied into the additional area, wherein
when the second binary program is executed in the computer, the computer stores the second instruction blocks corresponding to the executed first instruction blocks at locations where any other second instruction blocks are not stored within the cache memory, and object code of the first binary program is used during the process of converting the second binary program from the first binary program.

11. A binary program conversion method according to claim 10, wherein said producing comprises producing the second binary program including a part in which the second instruction blocks corresponding to the executed first instruction blocks are arranged successively.

12. A binary program conversion method according to claim 10, further comprising:

creating a line data indicating lines of the cache memory which are to be used when the produced second binary program is executed in the computer; and controlling said executing executes a third binary program comprising third instruction blocks, and said generating generates second executed blocks information from the executed third instruction blocks, and said producing produces a fourth binary program from the second executed blocks information and the line data, the fourth binary program comprising fourth instruction blocks corresponding to the executed third instruction blocks, wherein when the fourth binary program is executed in the computer, the computer stores the fourth instruction blocks corresponding to the executed third instruction blocks at locations on lines of the cache memory except the lines indicated by the line data.

13. A binary program conversion method according to claim 10, further comprising:

recognizing a frequency of use for data access of every line of the cache memory by monitoring running states of the executed first instruction blocks of the first binary program; and selecting lines having the lowest frequency of use from all lines of the cache memory to use for storing second instruction blocks based on a recognition result of said recognizing the frequency of use, and wherein said producing comprises producing the second binary program which causes, when executed in the computer, the computer to store second instruction blocks corresponding to the executed first instruction blocks at locations in the selected lines.

14. A binary program conversion method according to claim 11, further comprising:

searching a second instruction block containing on its end a conditional branch instruction whose branch destination is set for a next second instruction block; and changing a branch condition and the branch destination of the conditional branch instruction so that a transition from the searched second instruction block to the next second instruction block takes place without branching.

15. A binary program conversion method according to claim 10, wherein producing step involves producing the second binary program which causes, when being executed in the computer, the computer to store the second instruction blocks in the cache memory when the total size stored is within cache memory size, wherein the second instruction blocks are selected according to the executing frequency of each block.

16. A recording medium for recording programs for making a computer having a cache memory function as:

executing means for executing first instruction blocks of a first binary program after an additional area has been added to the first binary program, the additional area having a size of up to and including a size of the cache memory;

generating means for generating executed blocks information from the executed first instruction blocks; and producing means for producing a second binary program from the executed blocks information, the second binary program comprising second instruction blocks corresponding to the executed first instruction blocks of the first binary program, ones of the second instruction blocks having been copied into the additional area, wherein when the second binary program is executed in the computer, the computer stores the second instruction blocks corresponding to the executed first instruction blocks at locations where any other second instructions blocks are not stored within the cache memory, and object code of the first binary program is used during the process of converting the second binary program from the first binary program.

17. A binary program conversion apparatus, used for converting a first binary program including a plurality of object modules having a plurality of first instruction blocks into a second binary program which is executed in a computer having a cache memory without using a source code of the first binary program, comprising:

adding means for adding an additional area to the first binary program, the additional area having a size up to and including a size of the cache memory, and adding instructions of the additional area being jumped to from the first instruction blocks;

executing means for executing first instruction blocks of the first binary program with the additional area added;

generating means for generating executed blocks information from the executed first instruction blocks; and producing means for producing the second binary program by copying the first instruction blocks of the plurality of object modules into different areas where any other second instruction blocks of the second binary program are not stored within the additional area based on the executed blocks information, the second binary program comprising the second instruction blocks corresponding to the first instruction blocks, wherein when the second binary program is executed in the computer, the computer stores the second instruction blocks corresponding to the executed first instruction blocks at locations where any other second instruction blocks are not stored within the cache memory, and object code of the first binary program is used during a process of converting the second binary program from the first binary program.

18. A binary program conversion apparatus according to claim 17, wherein the size of the additional area is the same as the cache memory.

19. A method of converting a first binary program comprising a plurality of object modules having first instruction blocks into a second binary program which is executed in a computer having a cache memory without using a source code of the first binary program, comprising:

adding an additional area to the first binary program, the additional area being an additional area having a size corresponding to and including a size of the cache memory, and adding instructions of the additional area being jumped to from the first instruction blocks;

executing the first instruction blocks of the first binary program;

generating executed blocks information from the executed first instruction blocks; and producing the second binary program by copying the executed first instruction blocks of the plurality of the object modules into different areas within the additional area based on the executed blocks information, the second binary program comprising second instruction blocks corresponding to the executed first instruction blocks, wherein when the second binary program is executed in the computer, the computer stores the second instruction blocks corresponding to the executed first instruction blocks at locations where any other second instructions blocks are not stored within the cache memory, and object code of the first binary program is used during a process of converting the second binary program from the first binary program.

20. A method of converting a first binary program as recited in claim 19, wherein the size of the additional area is the same as the cache memory.

21. A computer program embodied on a computer-readable medium for converting a first binary program comprising a plurality of object modules having first instruction blocks into a second binary program which is executed in a computer having a cache memory without using a source code of the first binary program, comprising:

an adding element to add an additional area to the first binary program, the additional area being an additional area having a size up to and including a size of the cache memory, and adding instructions of the additional area being jumped to from the first instruction blocks;

an executing element to execute the first instruction blocks of the first binary program;

an generating element to generate executed blocks information from the executed first instruction blocks; and a producing element to produce the second binary program by copying the executed first instruction blocks of the plurality of the object modules into different areas within the additional area based on the executed blocks information, the second binary program comprising second instruction blocks corresponding to the executed first instruction blocks, wherein when the second binary program is executed in the computer, the computer stores second instruction blocks corresponding to the executed first instruction blocks at locations where any other second instruction blocks are not stored within the cache memory, and object code of the first binary program is used during a process of converting the second binary program from the first binary program.

22. A computer program as recited in claim 21, wherein the size of the additional area is the same as the cache memory.

23. A binary program conversion apparatus, used for converting a first binary program comprising first instruction blocks into a second binary program which is executed in a computer having a cache memory without using a source code of the first binary program, comprising:

adding means for adding a cache blocking area of predetermined size comprising a plurality of lines to the first binary program;

executing means for executing the first binary program;

generating means for generating executed blocks of information indicating first instruction blocks in the first binary program executed by said executing means; and producing means for producing, by copying the first instruction blocks into different areas within the cache blocking area based on the executed blocks of information generated by said generating means, the second binary program which contains second instruction blocks corresponding to the plurality of the first instruction blocks and which causes, when being executed in the computer, the computer to store second instruction blocks corresponding to the first instruction blocks executed by said executing means at different locations of the cache memory, wherein the source code of the first binary program is not used to create the second binary program, wherein the producing means compares a total size of the executed first instruction blocks with the size of the cache blocking area, and if the total size of the first instruction blocks is not larger than the size of the cache blocking area, determines a number of the lines, L, necessary for holding all of the executed instruction blocks, selects L number of lines of the cache memory, of which a frequency in use is low, produces the second binary program by copying the first instruction blocks into the location in the cache blocking area, the location corresponding to the selected lines, if the total size of the first instruction blocks is larger than the size of the cache blocking area, selects the larger number of the first instruction blocks in the order of frequency of being executed so that the total size of the selected first instruction blocks does not exceed the size of the cache blocking area, and produces the second binary program by copying the selected first instruction blocks into the cache blocking area.

* * * * *

UNITED STATES PATENT AND TRADEMARK OFFICE
CERTIFICATE OF CORRECTION

PATENT NO. : 6,591,414 B2
DATED : July 8, 2003
INVENTOR(S) : Yoshinobu Hibi et al.

It is certified that error appears in the above-identified patent and that said Letters Patent is hereby corrected as shown below:

Title page,
Item [56], References Cited, U.S. PATENT DOCUMENTS, change "Hodkway" to -- Hookway --, change "10/2000" to -- 3/1994 --.
FOREIGN PATENT DOCUMENTS, change "5-322481" to -- 5-324281 --.
OTHER PUBLICATIONS,
"Karl Pettis" reference, change "Porfile" to -- Profile --.

Column 20,
Line 15, after "program," insert a hard return before "wherein";
Line 25, after "claim 1," insert a hard return;
Line 26, after "wherein" insert a hard return;
Line 27, after "and" insert a hard return.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,591,414 B2 Page 1 of 1
APPLICATION NO. : 08/943207
DATED : July 8, 2003
INVENTOR(S) : Yoshinobu Hibi et al.

It is certified that error appears in the above-identified patent and that said Letters Patent is hereby corrected as shown below:

Column 18, line 67 replace "addition area" with --additional area--, therefor.

Signed and Sealed this

Eleventh Day of July, 2006

JON W. DUDAS
*Director of the United States Patent and Trademark Office*